(12) United States Patent
Sahut D'Izarn et al.

(10) Patent No.: US 12,481,653 B2
(45) Date of Patent: Nov. 25, 2025

(54) UNIFIED QUERY ENGINE FOR GRAPH AND RELATIONAL DATA

(71) Applicant: DASSAULT SYSTEMES, Vélizy-Villacoublay (FR)

(72) Inventors: Jean-Philippe Sahut D'Izarn, Vélizy-Villacoublay (FR); Frédéric Labbate, Vélizy-Villacoublay (FR); Alban Roullier, Vélizy-Villacoublay (FR); Eric Vallet Glenisson, Vélizy-Villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 0 days.

(21) Appl. No.: 18/544,175

(22) Filed: Dec. 18, 2023

(65) Prior Publication Data

US 2024/0202191 A1    Jun. 20, 2024

(30) Foreign Application Priority Data

Dec. 16, 2022  (EP) .................................... 22306926

(51) Int. Cl.
*G06F 16/00*   (2019.01)
*G06F 16/2453* (2019.01)
*G06F 16/901*  (2019.01)

(52) U.S. Cl.
CPC .. *G06F 16/24537* (2019.01); *G06F 16/24539* (2019.01); *G06F 16/9024* (2019.01)

(58) Field of Classification Search
CPC ............... G06F 16/9024; G06F 16/215; G06F 16/2365; G06F 16/24522; G06F 16/24539; G06F 16/24561; G06F 16/2465; G06F 16/26; G06F 16/288; G06F 16/3332; G06F 2216/03; G06F 40/20; G06F 40/35;

(Continued)

(56) References Cited

U.S. PATENT DOCUMENTS

2012/0197865 A1* 8/2012 Koch ................ G06F 16/24539
                                                    707/E17.017
2014/0118350 A1* 5/2014 Imhof ..................... G06T 15/08
                                                    345/424

(Continued)

FOREIGN PATENT DOCUMENTS

EP    4 195 065 A1   6/2023
EP    4 198 763 A1   6/2023

OTHER PUBLICATIONS

Extended European Search Report issued Apr. 28, 2023, in European Patent Application No. 22306926.1, 11 pages.

(Continued)

*Primary Examiner* — Shyue Jiunn Hwa
(74) *Attorney, Agent, or Firm* — Oblon, McClelland, Maier & Neustadt, L.L.P.

(57) ABSTRACT

A computer-implemented method for querying by a query engine on a database including relational data and graph data, the method including receiving a query by the query engine, the query being in a language compatible with a first order logic paradigm. The method further includes generating an intermediate representation, the IR being compatible with a first order logic paradigm. The method further includes using the intermediate representation of the query for executing the query on the relational data and the graph data of the database.

14 Claims, 10 Drawing Sheets

(58) Field of Classification Search
CPC ............... G06F 16/24542; G06F 16/71; G06F 16/7343; G06F 16/9027; G06F 17/16; G06F 17/18; G06F 21/552; G06F 2221/034; G06F 2221/2101; G06F 16/2453; G06F 16/951; G06F 16/3331; G06F 16/24545; G06F 16/285; G06F 16/248; G06F 16/355; G06F 40/30; G06F 16/9535; G06F 16/211; G06F 16/2462; G06F 16/258; G06F 16/334; G06F 16/35; G06F 16/36; G06F 18/29; G06F 40/18; G06F 18/2451; G06N 5/01; G06N 5/022; H04L 1/00; H04L 7/00; H04L 12/00; H04L 17/00

See application file for complete search history.

(56) References Cited

U.S. PATENT DOCUMENTS

2020/0233864 A1* 7/2020 Jin ........................ G06F 16/288
2023/0060589 A1* 3/2023 Ravishankar .......... G06N 3/042

OTHER PUBLICATIONS

"SQL-92", https://en.wikipedia.org/wiki/SQL-92, Wikipedia, 2023, 2 total pages.
"Appendix D. SQL Conformance", https://www.postgresql.org/docs/current/features.html, 2023, 2 total pages.
Transform data and knowledge into fast and accurate answers to complex question, https://www.oxfordsemantic.tech, Oxford Semantic Technologies Ltd., 2023, pp. 1-9.
Open Database Connectivity, https://en.wikipedia.org/wiki/Open_Database_Connectivity, Wikipedia, 2023, pp. 1-10.
"16. APIs—16.9.3. Registering a Data Source", https://docs.oxfordsemantic.tech/programmatic-access-APIs.html#registering-a-data-source, Oxford Semantic Technologies Ltd., 2023, 82 total pages.
"9.4 Querying Tuple Tables", https://docs.oxfordsemantic.tech/querying_html#querying-tuple-tables, Oxford Semantic Technologies Ltd., 2023, 15 total pages.
"7. Data Sources", https://docs.oxfordsemantic.tech/data-sources.html, Oxford Semantic Technologies Ltd., 2023, 13 total pages.
"Data integration", https://en.wikipedia.org/wiki/Data_integration, Wikipedia, 2023, 9 total pages.
"Materialized view", https://en.wikipedia.org/wiki/Materialized_view, Wikipedia, 2023, 4 total pages.
"Introduction to materialized views", https://cloud.google.com/bigquery/docs/materialized-views-intro, BigQuery, Google Cloud, 2023, pp. 1-10.
"SPARQL Query Language for RDF—1.2.3 Result Descriptions", https://www.w3.org/TR/rdf-sparql-query/#docResultDesc, W3C Recommendation, 2008, pp. 1-87.
"Dictionary coder", https://en.wikipedia.oeg/wiki/dictionary_coder, Wikipedia, 2023, 2 total pages.
"16. APIs—16.12. Evaluating Queries", https://docs.oxfordsemantic.tech/programmatic-access-APIs.html#evaluating-queries, Oxford Semantic Technologies Ltd., 2023, 82 total pages.
"16. APIs—16.14. Cursors", https://docs.oxfordsemantic.tech/programmatio-access-APIs.html#cursors, Oxford Semantic Technologies Ltd., 2023, 82 total pages.
"First order logic", https://en.wikipedia.org/wiki/First-order_logic, Wikipedia, 2023, 27 total pages.
"Relational model", https://en.wikipedia.org/wiki/Relational_model, Wikipedia, 2023, 12 total pages.
"SPARQL 1.1, Query Language—2 Making Simple Queries (Informative)", https://www.w3.org/TR/sparql11-query/#basicpatterns, W3C Recommendation, 2013, 97 total pages.
"A Direct Mapping of Relational Data to RDF", https://www.w3.org/TR/rdb-direct-mapping, W3C Recommendation, 2012, 12 total pages.
"Hash join", https://en.wikipedia.org/wiki/Hash_join, Wikipedia, 2023, 4 total pages.
"Logic for Relational Databases and Relational Algebra for Bags", Sibel Adali, http://www.cs.rpi.edu/~sibel/csci4380/spring2016/course_notes/logic_bagsemantics.html, 2016, 7 total pages.
"Datalog—Expressiveness", https://en.wikipedia.org/wiki/Datalog#Expressiveness, Wikipedia, 2023, 13 total pages.
"SPARQL 1.1, Query Language—5.1 Basic Graph Patterns", https://www.w3.org/TR/sparql11-query/#BasicGraphPatterns, W3C Recommendation, 2013, 97 total pages.
"Projection (relational algebra)", https://en.wikipedia.org/wiki/Projection_(relational_algebra), Wikipedia, 2023, 3 total pages.
"SPARQL 1.1, Query Language—10.2 Values: Providing inline data", https://www.w3.org/TR/sparql11-query/#nilne-data, W3C Recommendation, 2013, 97 total pages.
GitHub, postgres, https://github.com/postgres/blob/master/src/backend/parser, 2023, 3 total pages.
"Logical Processing Order of the Select statement", https://docs.microsoft.com/en-us/sql/f-sql/queries/select-transact-sgl?redirectfrom=MSDN&view=sql-server-ver15#logical-processing-order-of-the-select-statement; SQL Server, 2023, 9 total pages.
"BNF Grammar for ISO/IEC 9075:1992—Database Language SQL (SQL-92)", https://ronsavage.github.io/SQL/sql-92.bnf.html, GitHub, 1992, 73 total pages.
"BNF Grammar for ISO/IEC 9075:1992—Database Language SQL (SQL-92)—query specification", https://ronsavage.github.io/SQL/sql-92.bnf.html#query%20specification, GitHub, 1992, 73 total pages.
"R2RML: RDB to RDF Mapping Language", https://www.w3.org/TR/2012/REC-r2rml-20120927/, W3C Recommendation, 2012, 41 total pages.
"R2RML: RDB to RDF Mapping Language—10.2 Natural Mapping of SQL Values", https://www.w3.org/TR/2012/REC-r2rml-20120927/#natural-mapping, W3C Recommendation, 2012, 41 total pages.
"Convert Sql Like to Regex", https://codereview.stackexchange.com/questions/36861/convert-sql-like-to-regex, Review Stock Exchange, 2023, 8 total pages.
"What code would I use to convert a SQL like expression to a regex on the fly?", Stack Overlow, https://stackoverflow.com/questions/47052/what-code-would-i-use-to-convert-a-sql-like-expression-to-a-regex-on-the-fly, 2024, pp. 1-4.
"SPARQL 1.1, Query Language—8 Negation", https://www.w3.org/TR/sparql11-query/#neg-notexists, W3C Recommendation, 2013, 97 total pages.
"2.1.2.48 F301, Corresponding in query expressions", Microsoft Learn, https://learn.microsoft.com/en-us/openspecs/sql_standards/ms-tsgliso02/62cb97e3-3bc6-4e31-bffd-3617e1e5a64f, 2019, 1 total page.
"D.2. Unsupported Features", PostgreSQL: Documentation: 12, https://www.postgresql.org/docs/12/unsupported-features-sql-standard.html, 2023, 8 total pages.
"2.1.2.96 F695, Translation support", Microsoft Learn, https://learn.microsoft.com/en-us/openspecs/sql_standards/ms-tsgliso02/e9ca2b4e-f21e-4ce9-9257-0e358017c755, 2019, 2 total pages.
"Shapes Constraint Language (SHACL)", W3C Recommendation, https://www.w3.org/TR/shaol/, 2017, 76 total pages.
"OWL 2 Web Ontology Language Document Overview (Second Edition)", W3C Recommendation, https://www.w3.org/TR/owl2-overview/, 2012, 8 total pages.
"Dependency theory (database theory)", Wikipedia, https://en.wikipedia.org/wiki/Dependency_theory_(database_theory), 2023, 1 total page.
Jin, G., et al., "GRainDB: A Relational-core Graph-Relational DBMS", In: Proceedings of the 12th Annual Conference on Innovative Data Systems Research (CIDR'22), 2022, 6 total pages.
Dewitt, D., et al., "Split query processing in polybase", In : Proceedings of the 2013 ACM SIGMOD International Conference on Management of Data, 2013, pp. 1255-1266 (abstract only).
Grulich, P., et al., "Babelfish: Efficient Execution of Polyglot Queries", Proceedings of the VLDB Endowment, 2021, vol. 15, No. 2, p. 196-210.

(56) References Cited

OTHER PUBLICATIONS

Angles, R., et al., "The Expressive Power of SPARQL", In : International Semantic Web Conference. Springer, Berlin, Heidelberg, 2008. p. 114-129 (abstract only).
Green, T., et al., "Datalog and Recursive Query Processing", Now Publishers, vol. 5, No. 2, 2013, 24 total pages.
Melton, J., et al., "Understanding the New SQL: A Complete Guide". Morgan Kaufmann, 1993. (paper book source only).
Date, C.J., et al., "A Guide to the SQL Standard". New York : Addison-Wesley, third edition, 1993. (paper book source only).
RDF 1.1 N-Quads, "A line-based syntax for RDF datasets", W3C Recommendation, https://www.w3.org/TR/n-quads/, 2014, pp. 1-10.
SPARQL Query Language for RDF, "RDF Dataset", W3C Recommendation, https://www.w3.org/TR/rdf-sparql-query/#rdfDataset, 2008, pp. 1-87.
Abiteboul, S., et al., "Foundations of databases.", Reading: Addison-Wesley, 1995, 702 total pages.
"SPARQL 1.1, Query Language—16 Query Forms", W3C Recommendation, https://www.w3.org/TR/sparql11-query/#QueryForms, 2013, pp. 1-97.
Jaffray, J., "Query Engines: Push vs. Pull", Blog Notes, https://justinjaffray.com/query-engines-push-vs.-pull, 2021, pp. 1-14.
"SQL", https://en.qikipedia.org/wiki/SQL#Predefined_data_types, Wikipedia, 2023, pp. 1-14.
Xiao, G., et al., "The Virtual Knowledge Graph System Ontop", Nov. 1, 2020 (Nov. 1, 2020), 16th European Conference—Computer Vision—ECCV 2020, Cornell University Library, 201 Olin Library Cornell University Ithaca, NY 14853, pp. 259-277.
Rachapalli, J., et al., "RETRO: A Framework for Semantics Preserving SQL-to-SPARQL Translation", Sep. 18, 2011 (Sep. 18, 2011), XP055737294, Retrieved from the Internet: URL:http://iswc2011.semanticweb.org/fileadmin/iswc/Papers/ Workshops/Evo Dyn/evodyn_3. Pdf, pp. 1-16.
Sequeda, J., "Integrating Relational Databases with the Semantic Web: A Reflection", Jun. 10, 2017 (Jun. 10, 2017), SAT 2015 18th International Conference, Austin, TX, USA, Sep. 24-27, 2015; [Lecture Notes in Computer Science; Lect.Notes Computer], Springer, Berlin, Heidelberg, pp. 68-120.
Priyatna, F., et al., "Formalisation and experiences of R2RML-based SPARQL to SOL query translation using morph", World Wide Web, International World Wide Web Conferences Steering Committee, Republic and Canton of Geneva Switzerland, Apr. 7, 2014 (Apr. 7, 2014), pp. 479-490.
Michel, F., "Integrating Heterogeneous Data Sources in the Web of Data", Mar. 3, 2017 (Mar. 3, 2017), XP055506546, Retrieved from the Internet: URL:https://tel.archives-ouvertes.fr/tel-01508602v3/document, pp. 1-227.

* cited by examiner

UNIFIED QUERY ENGINE FOR GRAPH AND RELATIONAL DATA

CROSS REFERENCE TO RELATED APPLICATIONS

This application claims priority under 35 U.S.C. § 119 or 365 European Application No. 22306926.1 filed Dec. 16, 2022. The entire contents of the above application are incorporated herein by reference.

TECHNICAL FIELD

The disclosure relates to the field of computer programs and systems, and more specifically to a method, system and program for querying by a query engine on a database comprising relational data and graph data.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Furthermore, a number of systems for database management are offered for application of the above design systems and programs in In-memory databases, i.e., purpose-built databases that rely primarily on memory for data storage, in contrast to databases that store data on disk or SSDs. Such database management systems (DBMSs), include two main categories, relational database management systems (RDBMSs) and those referred to as graph database management systems (GDBMSs), which respectively use graphs and relations as the core data structures to model application data.

RDBMSs and GDBMSs have complementary capabilities that may appeal to users. For example, unlike graphs, the relational model is not restricted to binary relationships and easily models n-ary relationships between entities. At the same time, the relational model requires strict schematization of the data, while graph models are often semi-structured and provide more flexibility data modeling and data storage (e.g., storing sparse data). On the other hand, while SQL is very suitable to express standard data analytics tasks, the languages of GDBMSs contain specialized syntaxes for expression expressing queries with recursive joins. Graph model furthermore have better performance on graph workloads that contain many recursive and many-to-many join.

Due to the pros and cons of each of GDBMSs and RSBMSs, some solutions and methods have been proposed for a unified querying approach.

Document Dewitt et al., "Split query processing in polybase.", Proceedings of the 2013 ACM SIGMOD International Conference on Management of Data. 2013. p. 1255-1266, presents polybase, a feature of SQL Server PDW V2 that allows users to manage and query data stored in a Hadoop cluster using the standard SQL query operators on HDFS-resident data are translated into MapReduce jobs by the PDW query optimizer and then executed on the Hadoop cluster.

Grulich et al., "Babelfish: efficient execution of polyglot queries.", Proceedings of the VLDB Endowment, 2021, vol. 15, no 2, p. 196-210, presents Babelfish which is a data processing engine designed for polyglot queries. Babelfish introduces an intermediate representation that unifies queries from different implementation languages.

Jin et al., "GrainDB: A Relational-core Graph-Relational DBMS.", Proceedings of the 12 h Annual Conference on Innovative Data Systems Research (CIDR '22), 202, presents demonstrate GrainDB which is a system that extends the DuckDB RDBMS to provide graph modeling, querying, and visualization capabilities. In addition, GrainDB modifies the internals of DuckDB to provide a set of fast join capabilities, such as predefined pointer-based joins that use system-level record IDs (RID) and adjacency list-like RID indices, to make DuckDB more efficient on graph workloads.

RDFox (www.oxfordsemantic.tech/) disclose a main-memory, scalable, centralized data store that allows users to manage graph-structured data represented according to the RDF data model and query that data using the SPARQL 1.1 query language. RDFox can connect to external sources such as PostgreSQL or ODBC (en.wikipedia.org/wiki/Open_Database_Connectivity).

Within this context, there is still a need for an improved method for querying by a query engine on a database comprising relational data and graph data.

SUMMARY

It is therefore provided a computer-implemented method for querying by a query engine on a database comprising relational data and graph data. The method comprises receiving a query by the query engine, the query being in a language compatible with a first order logic paradigm. The method further comprises generating an intermediate representation (IR), the IR being compatible with a first order logic paradigm. The method then comprises using the intermediate representation of the query for executing the query on the relational data and the graph data of the database.

The method may comprise one or more of the following:
  if the query is a SPARQL query, the generated intermediate representation is translated into a predicate calculus of a first order logic of the SPARQL query;
  if the query is a SQL query, the generated intermediate representation is translated into a predicate calculus of a first order logic of the SQL query;

the relational data of the database comprises one or more tables and the graph data of the database comprises one or more adjacency matrices.

the query is a first SQL query, and the using of the intermediate representation of the query for executing the query on the graph data of the database comprises executing a SPARQL SELECT query on the graph data of the database thereby outputting tuples, creating a materialized view of the executed query, and executing the first SQL query on the created materialized view;

the method further comprising receiving a second SQL query wherein the executing of the second SQL query is based on the created materialized view of the first SQL query;

the creating of the materialized view comprises creating a table, wherein rows of said table are associated to the tuples, and columns of said table are associated to respective variables of the query; and/or the generated intermediate representation comprises at least one first FIND operator with at least an input, the method further comprising updating the generated intermediate representation by replacing the first find operator with a second find operator, the second find operator being configured to return undefined value when said input is null.

The received query may have at least one JOIN clause in SPARQL or in SQL, the generated intermediate representation being described with the Backus-Naur Form (BNF) grammar of the type:

```
<joined table> ::=
    <cross join>
    | <qualified join>
    | <left paren> <joined table> <right paren>
<cross join> ::=
    <table reference> CROSS JOIN <table reference>
<qualified join> ::=
    <table reference> [ NATURAL ] [ <join type> ] JOIN <table reference>
    [ <join specification> ]
<join type> ::=
    INNER
    | <outer join type> [ OUTER ]
    | UNION
<outer join type> ::= LEFT | RIGHT | FULL
<join specification> ::= <join condition> | <named columns join>
<join condition> ::= ON <search condition>
<named columns join> ::= USING <left paren> <join column list> <right paren>
<join column list> ::= < column name list>
```

The received query may have a FROM clause in SPARQL or in SQL, the generated intermediate representation being described with the BNF grammar of the type:

```
<from clause> ::= FROM <table reference> [ { <comma> <table reference>
}... ]
    <table reference> ::=
        <table name> [ <correlation specification> ]
        | <derived table> <correlation specification>
        | <joined table>
```

The FROM clause may comprise an AS clause, the generated intermediate representation being described with the BNF grammar of the type:

```
<correlation specification> ::=
    [ AS ] <correlation name> [ <left paren> <derived column list>
    <right paren> ]
    <derived column list> ::= < column name list>
```

The received query may have a WHERE clause in SPARQL or in SQL, the generated intermediate representation being described with the BNF grammar of the type:

```
<where clause> ::= WHERE <search condition>
<search condition> ::=
    <boolean term>
    | <search condition> OR <boolean term>
<boolean term> ::=
    <boolean factor>
    | <boolean term> AND <boolean factor>
<boolean factor> ::= [ NOT ] <boolean test>
<boolean test> ::= < boolean primary> [ IS [ NOT ] <truth value> ]
<boolean primary> ::= < predicate> | <left paren> <search condition>
<right paren>
    <predicate> ::=
        <comparison predicate>
        | <between predicate>
        | <in predicate>
        | <like predicate>
        | <null predicate>
        | <quantified comparison predicate>
        | <exists predicate>
        | <match predicate>
        | <overlaps predicate>
```

It is further provided a computer program comprising instructions for performing the method.

It is further provided a computer readable storage medium having recorded thereon the computer program.

It is further provided a system comprising a processor coupled to a memory and, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
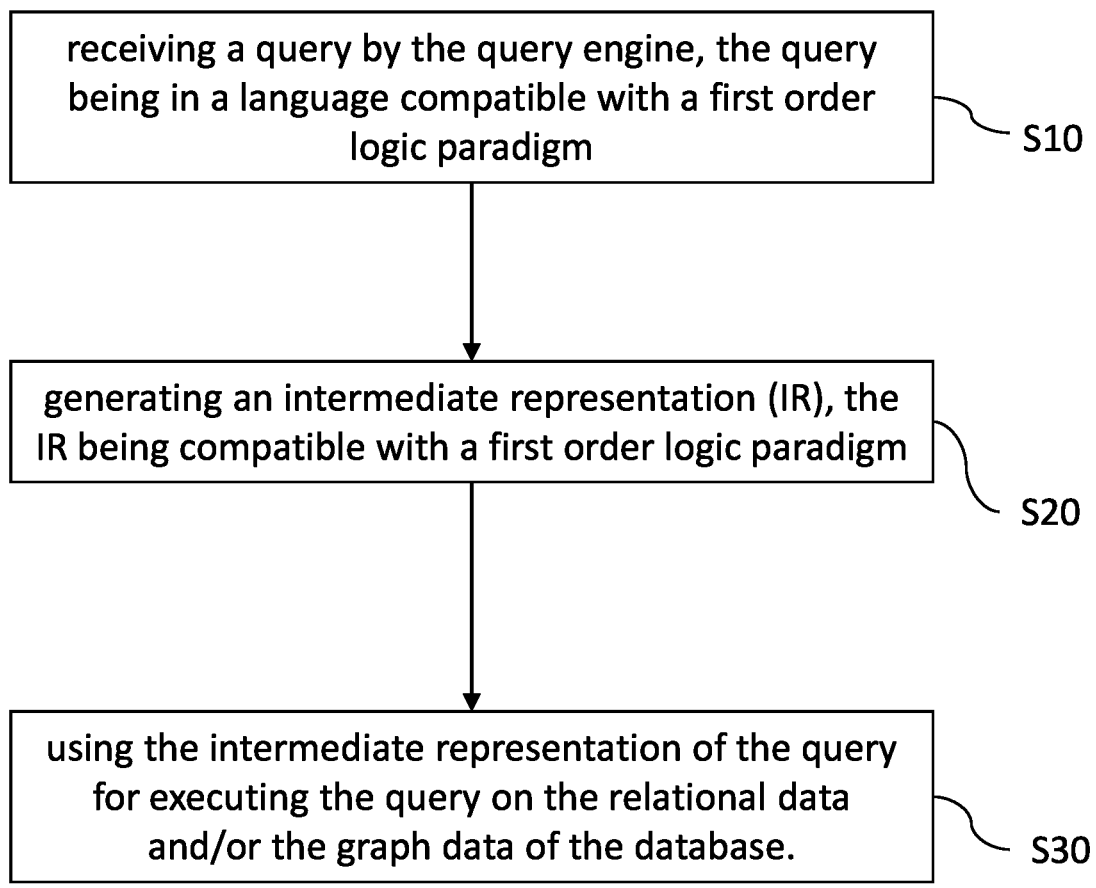
FIG. 1 shows a flowchart of an example of the method.

With reference to the flowchart of FIG. 1, described is a computer-implemented method for querying by a query engine on a database comprising relational data and graph data, the method comprising receiving a query by the query engine, generating an intermediate representation (IR), and using the intermediate representation of the query for executing the query on the relational data and the graph data of the database. The query is in a language compatible with a first order logic paradigm and the IR is compatible with a first order logic paradigm.

The method may additionally comprise providing (i.e., obtaining) the database comprising relational data and graph data. In such examples, the method may obtain said database using an online cloud, downloading the database from a remote server, or accessing a database on a persistent memory.

Such a method provides an improved solution which can perform queries on a database comprising both type of relational and graph data. The method is able to receive a query in a first order logic compatible language and produces a respective IR from this query which is executed on both relational and graph data part. In other words, the method provides a solution for polyglot databases, i.e., databases which support several languages.

Notably, the provided solution by the method does not need to duplicate the code, and as it is based on any conversion to a lower-level syntax different optimization techniques may be applied on (e.g., on join on indexes coming from dictionary encoding). Moreover, in such solutions each of graph data and relational data may be presented in their native format. On the other hand, as the method does not emulate it avoids the drawbacks of emulation, i.e., hard-to-achieve semantic compatibility and additional constraints of the underlying model. In particular, the method provides a great flexibility on the data format as it is not dependent on the schema, thereby the method can query efficiently unstructured data.

By a query, e.g., the received query, it is meant a read query (e.g., SELECT). By "database" it is meant any collection of data (i.e., information) organized for search and retrieval (e.g., a graph-oriented database). The database may be distributed or not distributed. As known in the art, a graph-oriented database, is an object-oriented database using graph theory, therefore with nodes and arcs, allowing data to be represented and stored. The graph relates the data items in the store to a collection of nodes and edges, the edges representing the relationships between the nodes. The relationships allow data in the store to be linked together directly and, in many cases, retrieved with one operation. Graph databases hold the relationships between data as a priority; contrarily to other database models (e.g., relational databases) that link the data by implicit connections. When stored on a memory (e.g., a persistent memory), the graph database allows a rapid search and retrieval by a computer. Especially, graph databases are structured to for fast retrieval, modification, and deletion of relationships in conjunction with various data-processing operations. Graph-oriented database is also referred to as graph database; the expressions "graph-oriented database" and "graph database" are synonymous.

In examples, the graph database may be an RDF graph database. RDF graphs are a traditional data model used for the storage and the retrieving of graphs. RDF graph is a directed, labeled graph data format. Such format is widely used for representing information in the Web. A standard specification has been published by W3C to specify RDF representation of information as graphs, see for example "RDF 1.1 Concepts and Abstract Syntax", W3C Recommendation 25 Feb. 2014 (or additionally the draft version RDF-star). An RDF graph database may have billions of tuples; for example the Uniprot dataset is a resource of protein sequence and functional information.

The core structure of the abstract syntax used is a set of tuples, each comprising a predicate. A set of such RDF tuples is called an RDF graph.

In examples, an RDF tuple may comprise three or four elements comprising nodes and edges. In examples, each RDF tuple (or elements of each RDF tuple) may be a triple comprising a subject, a predicate, and an object. In such examples, an RDF graph may be visualized as a node and a directed-arc diagram, in which each triple is represented as a node-arc-node link. Alternatively, an RDF triple may be visualized by two nodes, which are the subject and the object and an arc connecting them, which is the predicate.

In examples, the RDF tuple may be an RDF quad. An RDF quad may be obtained by adding a graph label to an RDF triple. In such examples, an RDF tuple includes the RDF graph. A standard specification has been published by W3C to specify RDF Quads (also referred to as N-Quads), see for example "RDF 1.1 N-Quads, A line-based syntax for RDF datasets", W3C Recommendation 25 Feb. 2014. An RDF quad may be obtained by adding a graph name to an RDF triple. A graph name may be either empty (i.e., for a default or unnamed graph) or an IRI (i.e., a graph IRI. In examples, a predicate of the graph may have a same IRI as the graph IRI. The graph name of each quad is the graph that the quad is part of in a respective RDF dataset. An RDF dataset, as known per se (e.g., see www.w3.org/TR/rdf-sparql-query//#rdfDataset) represents a collection of graphs. Hereinafter, the term RDF tuple (or tuple) indifferently refers to an RDF triple or an RDF quad, unless the use of one or the other is explicitly mentioned.

Possible optimizations for a query engine of a graph database are impacted by the assumption that the graph database is interacting with an Open World or a Closed World. As known per se, in a formal system of logic used for knowledge representation, the open-world assumption (OWA) is the assumption that the truth value of a statement may be true irrespective of whether or not it is known to be true. It is the opposite of the closed-world assumption, which holds that any statement that is true is also known to be true. On the other hand, Closed World Systems require a place to put everything (e.g., slot on a frame, field on an OO class, or column in a DB). OWA assumes incomplete information by default which intentionally underspecifies and allows others to reuse and extend. Semantic Web is a vision of a computer-understandable web which is distributed knowledge and data in a reusable form and RDF, the W3C recommendation for the Semantic Web, follows the Open World Assumption. It allows a greater flexibility in data modeling and data storage. Yet the constraints of a Closed World Assumption, as in the relational model with SQL, are useful for query optimizations since they provide more information on how the data is stored. In examples, the query is a SPARQL query. SPARQL is the W3C recommendation for querying RDF data and is a graph-matching language built on top of patterns of RDF tuples. In SPARQL queries as discussed below, a read query can be SELECT, ASK, DESCRIBE, CONSTRUCT (see www.w3.org/TR/sparql11-query/#QueryForms). By a "pattern of RDF tuples" it is meant a pattern/template formed by an RDF graph. In other words, a pattern of RDF tuples is an RDF graph (i.e., a set of RDF triples) where subject, predicate, object, or label of the graph can be replaced by a variable (for a query). SPARQL is a query language for RDF data able to express queries across diverse data sources, whether the data is stored natively as RDF or viewed as RDF via middleware. SPARQL is mainly based on graph homomorphism. A graph homomorphism is a mapping between two graphs that respects their structure. More concretely, it is a function between the vertex sets of two graphs that maps adjacent vertices to adjacent vertices.

SPARQL contains capabilities for querying required and optional graph patterns along with their conjunctions and disjunctions. SPARQL also supports aggregation, subqueries, negation, creating values by expressions, extensible value testing, and constraining queries by source RDF graph. This means SPARQL queries needs to answer to eight different triple patterns possible in the SPARQL. Such eight triple patterns include (S,P,O), (S,?P,O), (S,P,?O), (S,?P,?O), (?S,P,O), (?S,?P,O), (?S,P,?O), and (?S,?P,?O) in which variables are preceded in the pattern, by the symbol?. Variables are the output of triple patterns and may be the output of the SPARQL query. In some examples, variables may be the output of a SELECT query. The output of a SPARQL query may be built using the variables (e.g., aggregators like summation). Variables in a query may be used to build a graph homomorphism (i.e., intermediary nodes necessary to get the result of the query). In some examples, variables in a query may be neither used for output nor intermediary result. A Basic Graph Pattern (BGP) may be one of the eight triple patterns explained above. Additionally, a BGP may be a quad pattern with additionally having the label of the graph as the query variable. In particular examples where the method obtains one or more adjacency matrices each as representations of groups of tuples, subject and object may be queried on one adjacency matrix. In other words, in these particular examples, the BGPs may be any of (S,O), (S,?O), (?S,O), and (?S,?O). SPARQL may build more complex queries by joining the result of several BGPs and possibly other operators. Thus, competitive SPARQL engines require, at least, fast triple pattern solution and efficient join methods. Additionally, query optimizers are required to build efficient execution plans that minimize the number of intermediate results to be joined in the BGP.

In examples, the graph database has an existing triple store. A triple store (also referred to as RDF store) is a purpose-built database for the storage and retrieval of triples through semantic queries, as known in the art. A triple store can at least answer to the eight basic triple patterns of SPARQL described above. It may also answer to filtering constraints (e.g., "x>5") along with the triples pattern. Such a triple store is considered to be the storage engine on which a SPARQL query is executed by a query engine. A storage engine (also called "database engine") is an underlying software component that a database management system (DBMS) uses to Create, Read, Update and Delete (CRUD) data from a database, as known in the art.

Besides graph databases, as known in the art, there exist relational databases. A relational database is a database based on the relational model of data. A relational model organizes data into one or more tables (or "relations") of columns and rows, with a unique key identifying each row. SQL is the de facto language for relational databases. Among different variations of SQL, hereinafter it is meant SQL-92 standard (en.wikipedia.org/wiki/SQL-92) which is the strict minimum level supported by the query engine according to the method. Most of the industry incorporate relations, and there is an implicit schema in tabular relations that complicates the transition (or conversion) from tables of a relational database to graphs of a graph database.

In the more general field of databases, the foundations of database theory are based on first order logic. First order logic composes the relational calculus (and then SQL) but without recursion.

Back to FIG. 1, in step S10, the method comprises receiving a query by the query engine where the query in a language compatible with a first order logic paradigm. The method may receive the query according to any known method. By a "language compatible with a first order logic paradigm" it is meant a language which its syntax can be rewritten using first order logic predicates. As known per se "first order logic" (also known as first-order predicate calculus or first-order functional calculus) is symbolized reasoning in which each sentence, or statement, is broken down into predicates that assert a relationship among certain elements. For examples, the predicate can modify or define the properties of a subject. The syntax of first-order logic is defined relative to a signature which consists of a set of constant symbols, a set of function symbols and a set of predicate symbols. In examples, the query may be in SQL or SPARQL languages.

The method then, in step S20, generates an intermediate representation (IR). As known in the field of database management and computer science, IR is a Direct Acyclic Graph (DAG) of operators corresponding to a query. Such a DAG of operators itself corresponds to a query plan of the query. In other words, the operator DAG is a graph of operators whose nodes, called "operators", represent basic operations of the executor. Furthermore, by a "query plan" or "query execution plan" it is meant a sequence of steps used to access data in a (relational or graph) database management system. As known per se, the graph of operators comprises nodes (i.e., vertices) and edges, each node corresponds to an operator in the sequence of the operator and each edge defines the relation between two operators connected by said edge. The operator DAG may have a single root (i.e., the beginning of the graph), and a single leaf (i.e., the end of the graph). The single leaf is an emit operator. Other than the single root and the single leaf, each of other nodes in the graph of operators (i.e., each operator) receives input from a preceding node and provides its output to a following node. Hereinbelow, the words DAG and graph may be used interchangeably when applied to operators. As known per se such a graph of operators is generated and executable by the query engine. The execution is generally multi-threaded. In other words, the tuple buffers (i.e., produced streams of tuples by each of the operators grouped in batches may be consumed immediately by the next operator, or queued for execution later on, and may also be "stolen" (i.e., taken over) by another idle thread which then execute the corresponding operators.

The operators in the DAG of operators correspond to basic elements of query execution, i.e., each operator produces tuple buffers, i.e., streams of tuples, generally grouped in batches called buffers. The buffers of each operator are then consumed by the next operator(s) in the DAG. Operator executions correspond to calls to the underlying triple store, general computations on RDF Terms (i.e., arithmetic, string transformation, etc.) RDF Terms are presented in RDF 1.1 Semantics, W3C recommendation of 25 Feb. 2014. SQL predefined datatypes, see en.wikipedia.org/wiki/SQL#Predefined_data_types.

The Intermediate Representation may, in addition to the DAG discussed above, comprise a constant table containing all the constant values and indices contained in the IR, so that the IR may refer to them by a simple integer. This avoids storing values several times in the IR DAG itself which may be computationally costly. The generated IR is compatible with a first order logic paradigm. In other words, the generated IR can be rewritten using first order logic syntax. The generating of the IR may in particular comprise a parsing step over the query plan.

The method, in step S30, uses the intermediate representation of the query for executing the query on the relational data and the graph data of the database. In other words, the method may execute each of the basic operators of the DAG by the query engine. Each basic operator may be executed upon one or more calls by the query engine and consequently may produce streams of tuples, generally grouped in batches called buffers. The buffers may be then consumed by the next operators in the DAG.

In examples, if the (received) query is a SPARQL query, the generated intermediate representation may be translated into a predicate calculus of a first order logic of the SPARQL query. In examples, if the (received) query is a SQL query, the generated intermediate representation may be written (i.e., translated) into a predicate calculus of a first order logic of the SQL query. In other words, as the IR is directly made of operators using the first order semantic, the method may parse the received SPARQL/SQL query and then may generate the IR using operators of first order logic. The first order syntax is a common foundation for both SQL and SPARQL.

In examples, the relational data of the database may comprise one or more tables and the graph data of the database may comprise one or more adjacency matrices, for example upon a vertical partitioning. Alternatively or additionally, the graph data of the database may comprise the graph data which are not in the form of adjacency matrices. This constitutes an improved solution in unifying a querying over the relational and graph data as enables handling each respective part (i.e., relational and graph) database in their native form. In other words, the method may use the generated IR to execute the query on the relational data (e.g., in form of tables) and graph data (in form of adjacency matrices or graph) without using any conversion or emulation.

In examples, the (received) query may be a first SQL query, and the using of the intermediate representation of the query for executing the query on the graph data of the database may comprise executing a SPARQL SELECT query on the graph data of the database thereby outputting tuples. The method then may create a materialized view of the executed query, and execute the first SQL query on the created materialized view. This constitutes an improved method able to handle SQL queries over the graph databases in a fast and efficient way. In other words, the method forms a table of materialized view from results of SPARQL query on said database. In examples, the creating of the materialized view comprises creating a table, wherein rows of said table are associated to the (outputted) tuples, and columns of said table are associated to respective variables of the query.

The method according to above examples may further comprise receiving a second SQL query wherein the executing of the second SQL query is based on the created materialized view of the first SQL query. Thereby, the method may use the created materialized view for several SQL queries. This improves the performance of the query engine in particular when an interaction in real-time between a user and the database should be guaranteed. Such an improvement is particularly important in handling such interaction with large databases. A use case example of such interactions is disused later.

In order to present how an SQL query received by the method may be executed by an IR developed for a SPARQL SELECT query; examples of SELECT statement in SQL is now discussed. This means that a common IR may execute both SQL and SPARQL queries. As known the logical processing order of the select statement is the following: FROM, ON, JOIN, WHERE, GROUP BY, HAVING, SELECT (which applies the select variable list clause of the query), DISTINCT, ORDER BY.

In examples, the received query may have at least one JOIN clause in SPARQL or in SQL In such examples, the generated intermediate representation may be described with the Backus-Naur Form (BNF) grammar of the type:

```
<joined table> ::=
    <cross join>
    | <qualified join>
    | <left paren> <joined table> <right paren>
<cross join> ::=
    <table reference> CROSS JOIN <table reference>
<qualified join> ::=
    <table reference> [ NATURAL ] [ <join type> ] JOIN <table
    reference>
    [ <join specification> ]
<join type> ::=
    INNER
    | <outer join type> [ OUTER ]
    | UNION
<outer join type> ::= LEFT | RIGHT | FULL
<join specification> ::= < join condition> | <named columns join>
<join condition> ::= ON <search condition>
<named columns join> ::= USING <left paren> <join column list>
<right paren>
    <join column list> ::= < column name list>
```

In examples, the received query may have a FROM clause in SPARQL or in SQL. In such examples, the generated intermediate representation being described with the BNF grammar of the type:

```
<from clause> ::= FROM <table reference> [ { <comma> <table
reference>
} ... ]
    <table reference> ::=
        <table name> [ <correlation specification> ]
        | <derived table> <correlation specification>
        | <joined table>
```

In examples, the FROM clause may comprise an AS clause where the generated Intermediate representation may be described with the BNF grammar of the type:

```
<correlation specification> ::=
    [ AS ] <correlation name> [ <left paren> <derived column list> <right
    paren>]
<derived column list> ::= < column name list>
```

Further in examples, the received query may have a WHERE clause in SPARQL or in SQL and the generated intermediate representation may be described with the BNF grammar of the type:

```
    <where clause> ::= WHERE <search condition>
<search condition> ::=
        <boolean term>
    | <search condition> OR <boolean term>
<boolean term> ::=
        <boolean factor>
    | <boolean term> AND <boolean factor>
<boolean factor> ::= [ NOT ] <boolean test>
<boolean test> ::= < boolean primary> [ IS [ NOT ] <truth value> ]
<boolean primary> ::= < predicate> | <left paren> <search condition>
<right paren>
    <predicate> ::=
        <comparison predicate>
    | <between predicate>
    | <in predicate>
    | <like predicate>
    | <null predicate>
    | <quantified comparison predicate>
    | <exists predicate>
    | <match predicate>
    | <overlaps predicate>
```

By "the generated intermediate representation being described with the Backus-Naur Form (BNF) grammar" it is meant that for SQL queries the IR may be generated by the method from said BNF grammar (which is an SQL grammar). The generated IR by the method, however as discussed above, is common first order logic between SQL and SPARQL, thereby it is able to execute either SQL or SPARQL queries once generated.

In examples, the generated intermediate representation may comprise at least one first FIND operator with at least an input. In such examples, the method may further comprise updating the generated intermediate representation by replacing the first find operator with a second find operator. The second find operator may be configured to return undefined value when said input is null. An input for a FIND operator may form a filter (i.e., condition) on the output of the FIND operator. This improves the unification of SQL and SPARQL standard. As discussed in more detail later below a value in SQL can be null while this is not the case for SPARQL queries. In order to unify the IR for SPARQL and SQL queries the method may either require a NOT NULL constraint and treats both NULL and not existing output as UNDEF, or modify the FIND operators with the input to output UNDEF is the respective input is UNDEF.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 2:
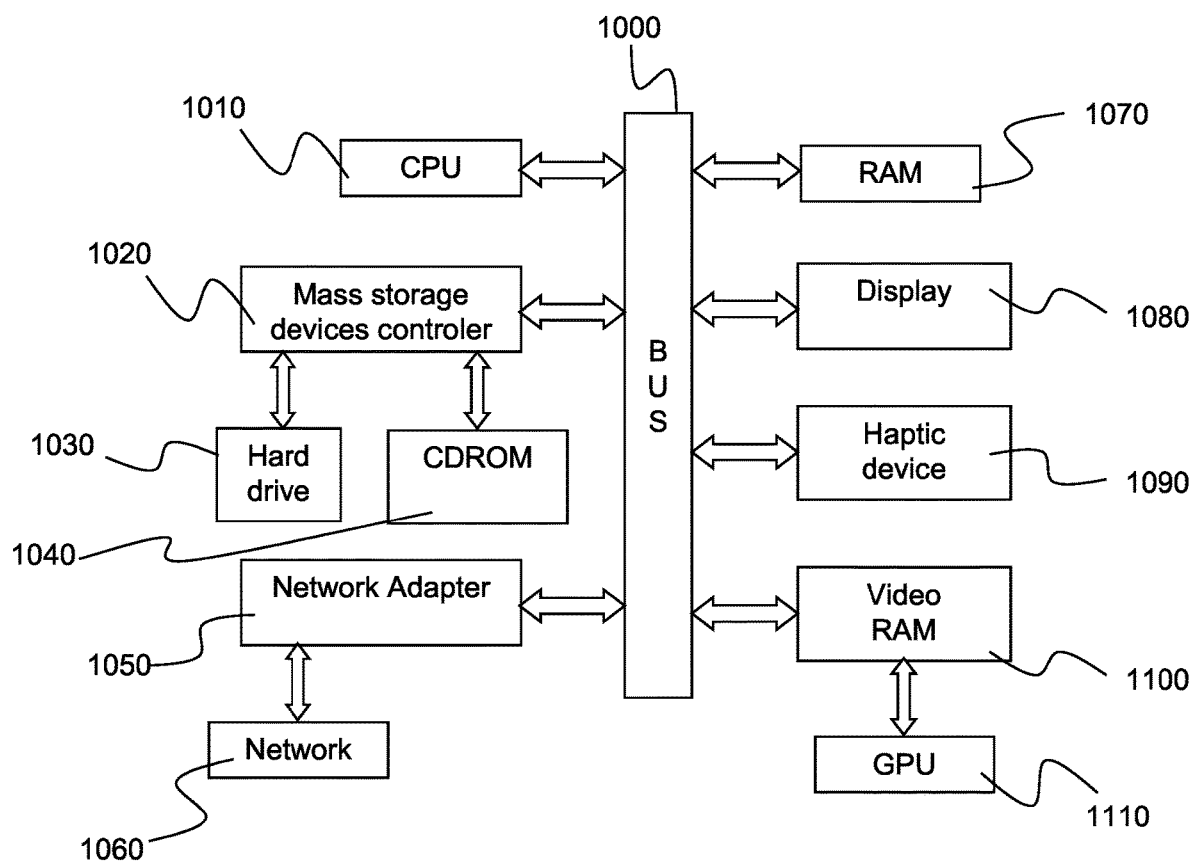
FIG. 2 shows an example of the system.

FIG. 2 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

Implementations of the hereinabove discussed examples of the method are now discussed.

The implementations are related to how to query relational and graph data inside a same database. Thereby the implementations serve the need to query structured (e.g., relational) and unstructured data (e.g., graph), from one database. The implementations in particular is related to a solution for polyglot databases regarding their general technical challenges in the prior art, i.e., data conversion cost, query execution time overhead, high complexity in translated queries, and lack of support for unstructured data. In other words, the implementations enable to query both graph and relational data inside a single query engine, without data conversion or emulation, while providing the support for both structured and unstructured data. The implementations may be particularly related to a read query, e.g., SELECT query.

According to implementations, the database comprises data structures for unstructured data (e.g., in form of adjacency matrices) and for structured data (e.g., in form of tables).

Both of these paradigms are based on the first order logic (en.wikipedia.org/wiki/First-order_logic). Therefore SQL and SPARQL queries are translated into the predicate calculus of the first order logic, using an intermediate representation that has meaning in both paradigms.

Both relational and graph data are represented using their native data structures (no conversion or emulation). The query engine is unified using an intermediate representation understandable by both paradigms, thus avoiding complex query translation from SQL to SPARQL (or vice-versa) or emulation.

As discussed in detail below SPARQL and non-recursive safe Datalog with negation have equivalent expressive power, and hence, by classical results, SPARQL is equivalent from an expressiveness point of view to Relational Algebra. The relational model (RM) can be defined as an approach to manage data using a structure and language consistent with first-order predicate logic where all data is represented in terms of tuples, grouped into relations. A database organized in terms of the relational model is a relational database. The purpose of the relational model is to provide a declarative method for specifying data and queries. In other words, where users directly state what information the database contains and what information they want from it (see en.wikipedia.org/wiki/Relational_model). As known, Datalog is a declarative logic programming language that syntactically is a subset of Prolog. It is often used as a query language for deductive databases. Datalog queries on finite sets are guaranteed to terminate. Query evaluation with Datalog is based on first-order logic, and is thus sound and complete.

The fact that SQL and SPARQL are both declarative languages helps to translate them to the same logical representation. The first-order predicate logic (en.wikipedia.org/wiki/First-order_logic) on which the relational model is built is the following:

First-order logic uses quantified variables over non-logical objects and allows the use of sentences that contain variables, so that rather than propositions such as "Socrates is a man" one can have expressions in the form "there exists x such that x is Socrates and x is a man" and "there exists" is a quantifier while "x" is a variable. In other words, one can see SQL queries as a declarative method to use predicate logic—the "there exists" quantifier—on sets of tuples (indexed by a given key in this set). We can define this quantifier as:

There Exists in a relation R a tuple indexed by a key K with value V for attribute A.

Note that the key, value and attribute can all be variables (as seen in the "Socrates" definition above).

Switching from set theory (SQL) to graph theory (SPARQL), one can draw the following parallel with the basic graph pattern (www.w3.org/TR/sparql11-query/#basicpatterns) in SPARQL:

There Exists in a graph G a triple of subject S with object O for predicate P.

Subject, predicate and object can also all be variables (and even the graph). This quantifier is the foundation of the query engine according to the implementations. This quantified is equivalently called hereinafter as Find. Therefore, the above sentence becomes:

Find in a graph G a triple of subject S with object O for predicate P.

For SQL:

Find in a relation R a tuple indexed by a key K with value V for attribute A, or using the terms more generally used in SQL:

Find in a table T a row indexed by a primary key K with value V for column A.

This Find quantifier is also the basic operator of the Intermediate Representation (IR) generated from the abstract syntax tree (AST) of the query. Drawing a parallel with the "there exists" quantifier of the first-order predicate logic, it is a common foundation to both relational model and graph model. This enables the implementations to query both relational data and graph data in the same query engine.

In particular, the implementations do not do "SPARQL-to-SQL" or "SQL-to-SPARQL" translation (as in (www.w3.org/TR/rdb-direct-mapping/), but rather the expression of both in a common representation, implemented by the IR.

Relational data are represented as tables and graph data as adjacency matrices. They are both first citizen and can be compressed with the same dictionary encoding. Being in the same database, if a table is created from the results of a SPARQL query, a modification of the graph data in the adjacency matrices can be easily propagated to the tabular data.

As there is no emulation, the implementations can create a table inside the graph database and query it is using the same query engine used for graph queries. Consequently, it is possible to do a query joining graph data and tabular data with good performances. Contrary to the discussed methods in the art, tabular data must not be fetched each time from an external data and can benefit from in-database optimizations (e.g., dictionary encoding) and data freshness.

The implementations provide solutions for unified query engine for graph and tabular data with duplication of code, possible optimizations like e.g., join on indexes coming from dictionary encoding (in the same spirit of hash joins en.wikipedia.org/wiki/Hash_join except that the hash table is a built-in from the database). These solutions are further advantageous as tabular data are not emulated and do not come with limitations when used for pagination. Furthermore, tabular data according to the implementations are not converted nor duplicated into graph data, which implies less storage used compared to a solution e.g., with mapping translation. The implementations also enable creating materialized views from graph query results which consequently can be queried within the graph database.

Logic in Databases

Theoretical aspects of the implementations are now discussed.

As known per se (e.g., from the document Abiteboul et al., "Foundations of databases.", Reading: Addison-Wesley, 1995 and/or the document Angles and Gutierrez, "The expressive power of SPARQL.", International Semantic Web Conference, Springer, Berlin, Heidelberg, 2008, p. 114-129, which are incorporated herein by reference), the relational algebra and non-recursive safe Datalog with negation have the same expressive power (i.e., they express exactly the same set of queries). The cited document of Angles and Gutierrez further shows that SPARQL has also the same expressive power in the form of the following theorem:

Theorem. SPARQL has the same expressive power as Relational Algebra under bag semantics.

The proof of the theorem cited above is based on the fact that relational algebra and non-recursive safe Datalog with negation have the same expressive power. By a "bag" it is meant a multiset, i.e., a set that potentially contains multiple copies of the same tuple depending on the schema (see for example www.cs.rpi.edu/~sibel/csci4380/spring2016/course_notes/logic_bagsemantics.html).

The implementations, in particular, use the fact that the first order logic, or, in other words, non-recursive safe Datalog with negation is a founding theoretical ground for both SPARQL and SQL. Thereby, the implementations address both SPARQL and SQL by expressing the execution of a query in first-order logic.

The fundamental predicate (in the meaning of first-order logic, not RDF meaning) is, in both SQL and SPARQL languages is the existential identifier (i.e., ∃) of equivalently a Find operator in IR. In other words, for SPARQL it is:

Find in a graph G a triple of subject S with object O for predicate P.

The Find fundamental predicate in SPARQL is called a basic graph pattern (see www.w3.org/TR/sparql11-query/#BasicGraphPatterns) as discussed above. On the other hand, for SQL it is:

Find in a table T a row indexed by a primary key K with value V for column A.

The Find fundamental predicate in SQL is called a projection (see en.wikipedia.org/wiki/Projection_(relational_algebra).

A query engine according to the implementations is very flexible to the data format since there is no schema in RDF. The "Find" operator described above is the basic unit for fetching data in such a query engine. Upon having the "Find" operator, the rest of the execution is a logical processing of a graph of operator.

Since SPARQL and SQL have the same expressive power as discussed above, they have a common logical processing. The implementations, as discussed in detail hereinbelow, can execute SPARQL queries as well as SQL queries using an IR the query engine developed for SPARQL.

Aspects of the implementations regarding SQL are now discussed.

The implementations may be adopted by a query engine which supports at least the standard SQL-92 (see en.wikipedia.org/wiki/SQL-92). This low requirement makes the implementations have wider applications as not all SQL query engines support the latest standard (the latest is 2016) for example, PostgreSQL: www.postgresql.org/docs/current/features.html).

One difference between SQL and SPARQL is that there are schemas (i.e., implicit schemes) in SQL. By "implicit schema" it means that the schema is implicit in a query, mainly with the use of the wildcard *. In other words, getting all columns of a table and other similar requests are answered by keeping these metadata inside the database.

Furthermore, a value in SQL can be null. A null value in SQL is not considered as a real value. This means that for the following Table 1, having C1 as primary key, the answer to the question:

Find in a table T0 a row indexed by a primary key 20 with value V for column C2 is null, while there is no answer to the question:

Find in a table T0 a row indexed by a primary key 42 with value V for column C2.

TABLE 1

| T0 | |
|---|---|
| C1 | C2 |
| 10 | AA |
| 20 | null |

However, for both questions, the protocol between the query engine and the storage is that the answer is UNDEF as defined in: www.w3.org/TR/sparql11-query/#inline-data (meaning: "a variable has no value", also defined as "an unbounded value"). This approach helps the storage to not materialize all null values, to not allow to do JOIN operators on null value between columns, and to remove the need to add IR nodes to add null values in outer joins. This matches as well with the choice in the already cited document by Angles and Gutierrez, "The expressive power of SPARQL") to ensure that the expressivity of SPARQL and relational algebra are the same.

According to the implementations, the IR manages null propagation, meaning that the fact that a variable is «null» is propagated in all the DAG of operators by the IR.

The implementations further incorporate a SQL parser and SQL Abstract Syntax Tree (AST) in the query engine. This may be done according to the known methods in the art, for example
github.com/postgres/postgres/blob/master/src/backend/parser.

An example is now considered with respect to Table 2 to present IR and its notation:

TABLE 2

| T1 | |
|---|---|
| C1 | C2 |
| 10 | 15 |
| 20 | 25 |

A very basic SQL statement is a query that fetches all rows from the table and returns them to the user. In other words:

SELECT *
FROM T1

This query simply fetches all rows from table T1. The query engine starts by asking to the storage all the column names of the table T1 and gets back {C1, C2}. It asks also for the column corresponding to the primary key, which is C1 here. SELECT and FROM clauses are discussed later hereinbelow.

To translate the SQL statements to the logical IR, the implementations use the quantifier described above:

Find in a table T a row indexed by a primary key K with value V for attribute.

Figure 3:
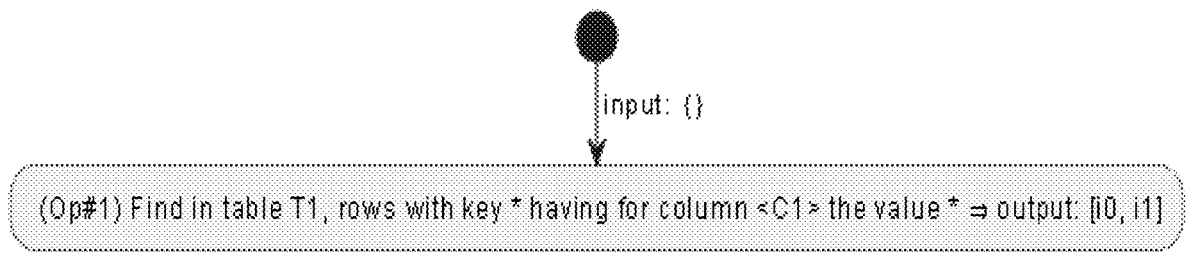
FIGS. 3, 4, 5, 6, 7, 8, 9A, 9B, 10, 11, 12, 13 and 14 show examples of intermediate representations according to the method.

FIG. 3 presents the SQL query which using the IR notation. FIG. 3 does not describe the execution itself but rather the IR, i.e., the flow of operators that will be executed. The (Op #1) is an optional identifier for the IR operator and for the matter of reference. In other words, it does not imply any order of execution. The wildcard * represents the variables generated by the operator and their name is given in the output [i0, i1] which are not the variables of the SELECT clause, but rather column indices. In the notation, column indices are presented by i prefix and v is used to refer to the values. In the notations, the constant of the query (i.e., not the variables/column indices) are written between quotes (" . . . ") for literals, and between < . . . > otherwise.

Figure 4:
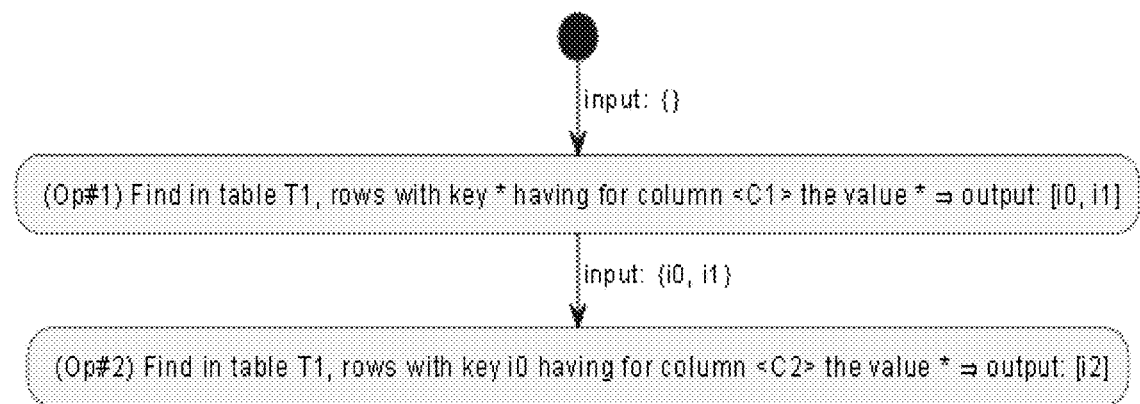

FIG. 4 presents an operator needed to fetch the values in column C2. The operator (Op #2) takes the variable i0 as input which represents the primary key of the rows and is needed to group together all the values of a given row. Up to this step only indices are used.

Figure 5:
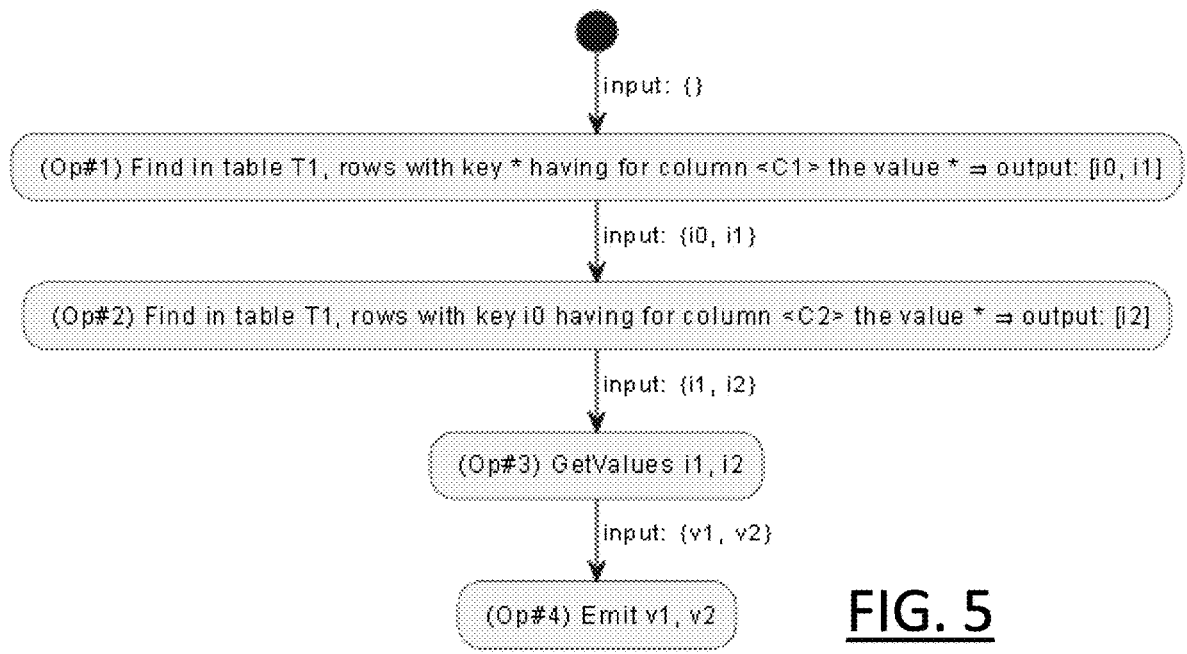

FIG. 5, presents getting the actual values and emit them to create the resulted records. This completes the flow of execution.

The implementations execute the flow of execution according to the following. The operator (Op #1) has no input and output the keys and the values in column C1 for the two rows according to Table 3:

TABLE 3

| i0 | i1 |
|----|----|
| 10 | 10 |
| 20 | 20 |

Since in this example only the integers are present, it is possible to consider the indices as the values. Next, the operator (Op #2) takes as input {i0, i1} and uses the input column i0 as the primary keys to find the corresponding values in C2. Its output are the values for C2 added in a result column called i2. In later steps i0 is no longer need and the implementations do not keep it anymore. The output is according to Table 4:

TABLE 4

| i1 | i2 |
|----|----|
| 10 | 15 |
| 20 | 22 |

The role of the (Op #3) GetValue is to convert the indices to values. In this example as the indices are considered to be the same as the values, GetValue is a no-op. The last operator (Op #4) is here to emit the values to the post processor which creates the records and gives them to the calling application code.

Figure 6:
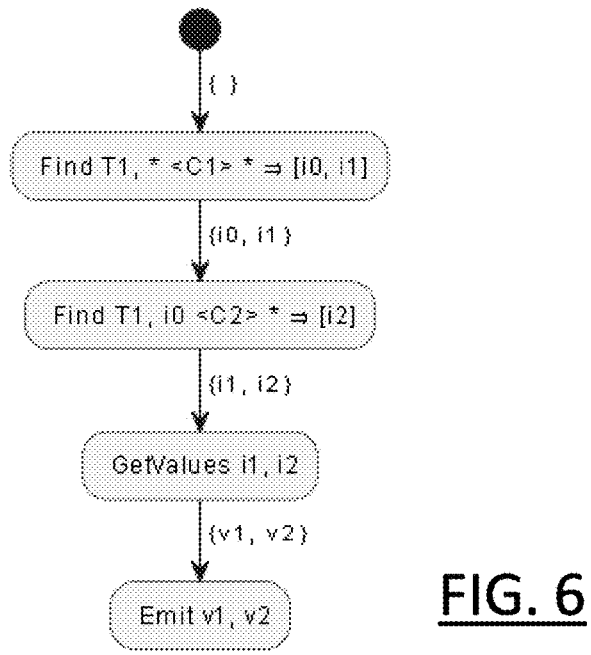

FIG. 6 presents another version of the IR presented in FIG. 5 using a simplified notation. The simplified notation is used hereinafter.

Find with Null Values

In examples where all rows may not be created with the NOT NULL constraint as above, any Find can produce undef values. Since a Find cannot have an undef as input, the implementations replace any Find having inputs by an optional Find with an if undef condition. In other words, an optional Find to manage the case where no values are found (i.e., the null case since null and undef are considered equal), and an if undef condition to filter out the undef inputs.

Figure 7:
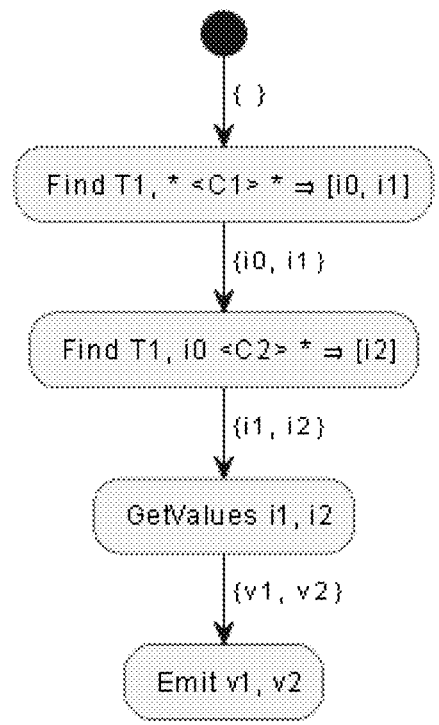
Figure 8:
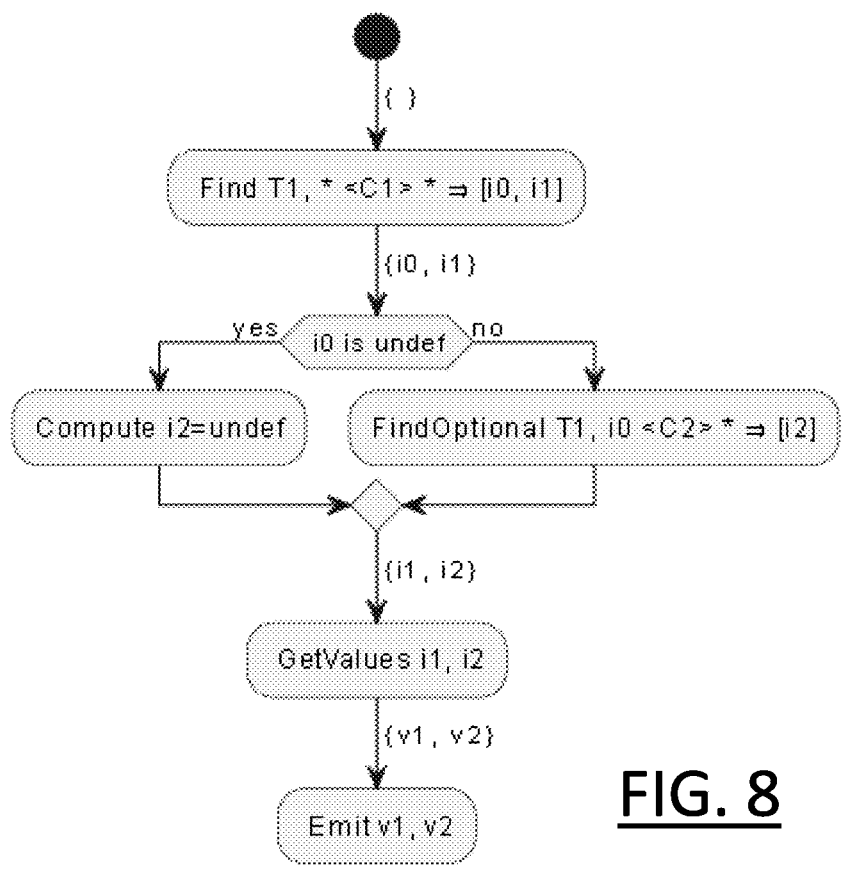

For example, FIG. 7 shows an IR graph. The implementations replace the IR graph of FIG. 7 by the corresponding one in FIG. 8. In other words, the IR according to these implementations is replaced so to output undef if the input to the Find operator is undef. The "FindOptional" operator in FIG. 8 may be same as a "Find" operator.

Figure 9A:
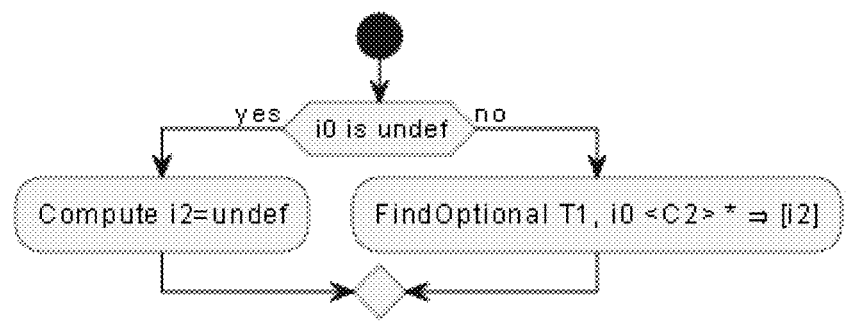
Figure 9B:
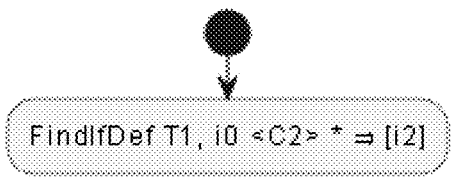

FIGS. 9A-B show a simplification of the IR graph by introducing in the IR a new node "FindIfDef" that optimizes the DAG of operators. Such an optimized DAG of operators may have fewer nodes in the IR. Therefore, the implementation may replace any "Find" operator that has inputs by a FindIfDef if the column used is not created with the NOT NULL constraint. Hereinbelow each of such "Find" operators should also be interpreted as a "FindIfDef". This does not change the semantic of the IR graphs. Furthermore, "i0 is undef" is an operator called "FilterBound" in the IR.

SQL Statements: Query Specification

In the following, examples of the implementations related to the query specification in SQL (i.e., the SELECT statement) are discussed. Such examples detail the translation from SQL statements to IR. The logical processing order of the select statement is the following: FROM, ON, JOIN, WHERE, GROUP BY, HAVING, SELECT, DISTINCT, ORDER BY (see docs.microsoft.com/en-us/sql/t-sql/queries/select-transact-sql?redirectedfrom=MSDN&view=sql-server-ver15#logical-processing-order-of-the-select-statement). This order determines when the objects defined in one step are made available to the clauses in subsequent steps.

The examples are presented based on a BNF expression in the standard ronsavage.github.io/SQL/sql-92.bnf.html. The SELECT query may be described according to this standard as

```
<query specification> ::=
    SELECT [ <set quantifier> ] <select list> <table expression>
```

FROM: a Table Expression

A table expression is either a base table (i.e., physically stored in the database), a materialized view (which is more generally called "view" in SQL), or a virtual table given as output from another clause (e.g., a join).

A table expression in the BNF grammar is:

```
<table expression> ::=
    <from clause>
    [ <where clause> ]
    [ <group by clause> ]
    [ <having clause> ]
```

The FROM clause is always required in this expression.

Like all the first six statements in the order above (i.e., FROM, ON, JOIN, WHERE, GROUP BY, HAVING), each clause in the expression above acts as an operator that takes input and produces output (As known per se, for example see Melton and Simon, "Understanding the new SQL: a complete guide", Morgan Kaufmann, 1993). Each clause produces a virtual table and the input of the FROM clause is one or more tables (e.g., base tables or views). This table reference is either a JOIN expression (as discussed later), a table name, or a table expression in parentheses.

In case that the table reference is a table name, the table reference may optionally also include an AS clause. In case that table reference is a table name, the table reference must include an AS clause. For example, for FROM T AS MYTABLE, the BNF is:

```
<from clause> ::= FROM <table reference> [ { <comma> <table reference>
}... ]
    <table reference> ::=
        <table name> [ <correlation specification> ]
        | <derived table> <correlation specification>
        | <joined table>
    <correlation specification>
        ::=
    [ AS ] <correlation name> [ <left paren> <derived column list>
<right paren> ]
    <derived column list> ::= <column name list>
```

In the above expression, the AS clause is syntactic sugar (i.e., syntactically optional) and may be omitted. This AS clause introduces a range variable. The standard uses correlation names, but range variable is the orthodox term and means a variable in the sense of logic. By the sense of the logic it means that it is not the usual programming language sense—that ranges over the set of tuples in some relation (or the set of rows in some table, in SQL terms). This range variable can be implicitly declared, as in the example above, where it ranges over all the rows of the table. The scope of this variable is important to define the variable decisiveness in the IR. A decisive variable is a variable that is read by a triple pattern later in the query. The scope of this variable is defined as following: if the table reference represents a FROM clause operand, the scope is the select-expression that immediately contains that FROM clause (i.e., the SELECT clause, the FROM clause itself, the WHERE clause if any, the GROUP BY clause if any, and the HAVING clause if any)—excluding any select-expression or join expression that is nested anywhere within the original select-expression in which another range variable is introduced with the same name.

Therefore, the implementations compute the scopes to decide IR variable decisiveness (i.e., to determine which variables in IR are decisive) and to filter table names according to existing tables from the storage, as in SPARQL.

In the above BNF grammar of the FROM clause:

```
<table reference> ::=
    <table name> [ <correlation specification> ]
    | <derived table> <correlation specification>
    | <joined table>
``` after simple table names, derived tables and joined table come. Examples of joined tables are discussed hereinbelow.

JOIN, ON Expressions

The implementations do not need joins to execute queries on a materialized view. This is the same for the use case example which is discussed later in which the pagination has only the view created by the results of the SPARQL query.

As known per se, a join table expression represents an explicit join of some kind between two tables, each of which is represented by a table reference (see [8] Date and Darwen, "A Guide to the SQL Standard". New York: Addison-Wesley, third edition, 1993). More precisely, a join expression is either a cross join, or a join involving an explicit or implicit join type.

This corresponds to the following grammar:

```
<joined table> ::=
    <cross join>
    | <qualified join>
    | <left paren> <joined table> <right paren>
<cross join> ::=
    <table reference> CROSS JOIN <table reference>
<qualified join> ::=
    <table reference> [ NATURAL ] [ <join type> ] JOIN <table
        reference>
    [ <join specification> ]
<join type> ::=
    INNER
    | <outer join type> [ OUTER ]
    | UNION
<outer join type> ::= LEFT | RIGHT | FULL
<join specification> ::= <join condition> | <named columns join>
<join condition> ::= ON <search condition>
<named columns join> ::= USING <left paren> <join column list>
<right paren>
<join column list> ::= <column name list>
```

Cross Join

The first and simplest join is the cross join, which is just another term for Cartesian product. The expression A CROSS JOIN B evaluates to a table consisting of all possible rows ab such that ab is the concatenation of a row a from A and a row b from B. It is semantically identical to:

```
SELECT *
FROM A,B
```

The Cross Join algorithm takes all the rows of both tables and does the Cartesian Product, or in other words, takes all the tuples of both relations and do the Cartesian Product. Using the Find operator described above, this can be rephrased as:

for each table, for each column of the table, find all the rows; and the need to do the Cartesian product of the output of each table.

Figure 10:
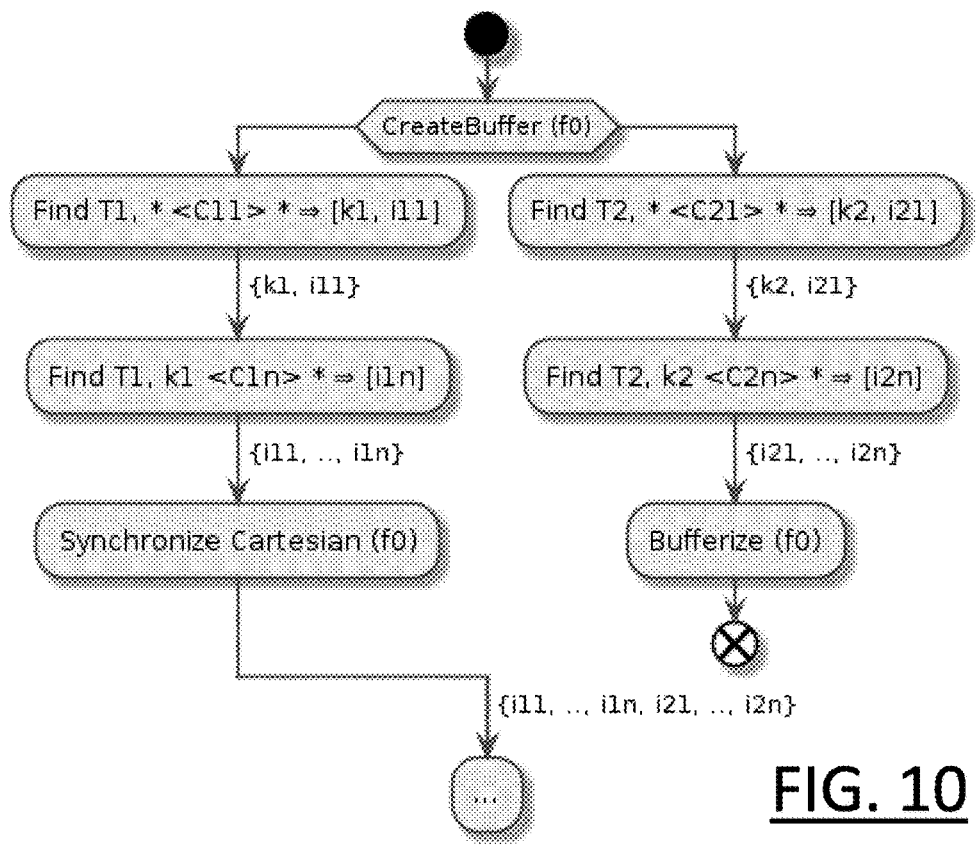

FIG. 10 presents an example using the IR convention, for table T1 and T2 with columns {C11, ..., C1n} and {C21, ..., C2n}.

Since the IR execution may be multi-threaded as discussed above, the implementations may use the Synchronize and Bufferize operators. The Synchronize Cartesian operator waits until all the other threads to be finished before merging their outputs in a cartesian manager. All these other threads are buffering their results, hence the Bufferize operators. The CreateBuffer operator is here to declare the flag f0 on which the synchronization between Bufferize and Synchronize will be made. These three operators are more complex versions of Synchronize and Bufferize for the SPARQL OPTIONAL pattern and the implementations may need to add these three in the IR. The flag created by CreateBuffer has a semantic slightly different from the one used by OPTIONAL in SPARQL. In the implementations it means buffering all results before doing the synchronize Cartesian step.

Using a Bufferize operator in the IR is coherent with the SQL philosophy of representing all intermediate results as virtual tables as Bufferize creates an intermediate virtual table. The implementations may efficiently Implement this operator.

The implementations may not keep in memory all the intermediary results memory for both tables which are needed to the Cartesian product. As the execution of the IR is multithreaded, the implementations may use a synchronization mechanism between the two streams of results. In a variation of the implementations, there can be SPARQL queries similar to Cartesian product such as:

```
SELECT ?a ?b
WHERE {
    <x> <p> ?a .
    <y> <q> ?b
}
```

Another variation of the implementations (so called Volcano (model) implementation in the field of computer science, see for example justinjaffray.com/query-engines-push-vs.-pull/) re-executes the secund pattern for each input of the first. Furthermore, a vectorized implementation based on IR optimize such implementations by executing the secund pattern (corresponding to a Find operator) once by input buffer.

In these two variations, the intermediary results needed to the cartesian product are not kept in the memory, but the cost paid is that the secund operator is executed many times. The two algorithms are possible, with the usual trade-off between CPU, memory and synchronization. In other words, the Volcano implementations need less memory and synchronization, but more CPU cost. On the hands, the vectorized implementations require more memory for less CPU cost, while need additional synchronization effort.

Natural Join

The next join in the grammar is the natural join, which is based on all columns in the two tables that share the same name. Considering two tables T1 (first and second columns presented in Table 5 below) and T2 (third and fourth columns presented in Table 5 below) where C1 is the primary key for both, the result of following operation:

```
SELECT *
FROM T1 NATURAL JOIN T2
``` is according to Table 6 below.

TABLE 5

| T1 | | T2 | |
|---|---|---|---|
| C1 | C2 | C1 | C4 |
| 10 | 15 | 10 | BB |
| 20 | 25 | 15 | DD |

TABLE 6

| C1 | C2 | C4 |
|---|---|---|
| 10 | 15 | BB |

In other words, the natural join according to the implementations output the matching rows based on all common columns while the columns with the same name will appear only once.

The implementations may translate this to IR, by fetching beforehand all column names for both tables and compute the intersection. Then the implementations fetch all rows for the common column on T1, intersect it with the rows of T2 on the common columns, then fetch the values for the remaining columns with the selected rows.

Figure 11:
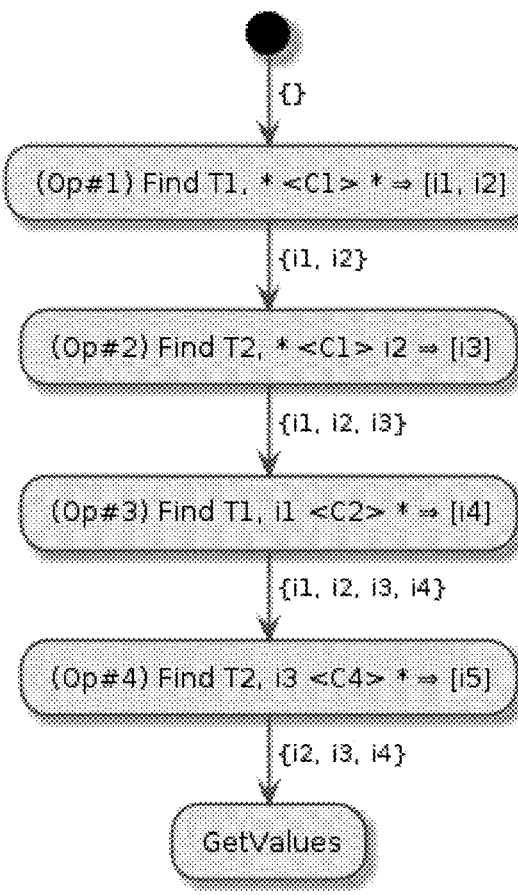

FIG. 11 presents an IR for the above example according to the implementations and using the Find operator. Op #1 fetches all the primary keys and values of T1 for column C1, that is according to Table 7 below

TABLE 7

| i1 | i2 |
|---|---|
| 10 | 10 |

Next, in Op #2, the implementations perform a step where to get the primary keys of T2 for column C1 where the values are the same as the one in table T1. That is where the join happens. The result of such an operation is presented in Table 8 below:

TABLE 8

| i1 | i2 | i3 |
|---|---|---|
| 10 | 10 | 10 |

In Op #3, the implementations get the values in column C2 in T1 using the primary keys of T1 found in Op #1 (i1) as presented in Table 9 below.

TABLE 9

| i1 | i2 | i3 | i4 |
|---|---|---|---|
| 10 | 10 | 10 | 15 |

Then, the implementations get the values of C4 in T2 using the primary keys of Op #2 (i3) as presented in Table 10 below.

TABLE 10

| i1 | i2 | i3 | i4 | i5 |
|---|---|---|---|---|
| 10 | 10 | 10 | 15 | 42 |

As the implementations do not need the primary keys anymore, the respective columns are dropped in the output. Notice that the literal "BB" is replaced here by its index (42). Finally, the implementations extract the values. The extracted values are presented in Table 11 below.

TABLE 11

| v2 | v4 | v5 |
|---|---|---|
| 10 | 15 | BB |

Note that the figure above does not show the request on the storage to compute the list of common columns: {C1} and the list of remaining columns for T1: {C2} and for T2: {C4}. This is based on the schema protocol that needs to be added to the storage engine API. This schema protocol is specific to SQL and is required because such a schema is implicit in a SQL query In other examples, the implementations may employ natural join to qualify some of other join types as: inner, outer and union.

Condition Join

The implementations may use an ON clause to specify the column on which join the tables apply, instead of doing it implicitly like in the natural join.

```
SELECT *
FROM T1 JOIN T2
ON T1.C1 = T2.C3
```

Instead of ON, USING is a syntactic sugar with the same purpose:

```
SELECT *
FROM T1 JOIN T2
USING (C1, C2)
```

Both cases discussed are an adaptation of the natural join algorithm. A WHERE clause can also be specified as discussed later.

The join operations discussed up to now are also known as inner joins. The keyword inner join can replace the join one in the previous examples as syntactic sugar.

Outer Join

As opposed to inner joins, the outer join operation preserves unmatched rows from one or both tables, depending on the keyword used: left, right or full. In other words, inner join dismissed any rows where the specific search condition is not met, while outer join keeps some or all of the unmatched data. Considering the example of T1 and T2 from Table 5, the result of

```
SELECT *
FROM T1 LEFT OUTER JOIN T2
ON T1.C1 = T2.C3
```

Is as of Table 12 below:

TABLE 12

| C1 | C2 | C3 | C4 |
|----|----|----|------|
| 10 | 15 | 10 | BB |
| 20 | 25 | null | null |

By definition, each row in the input (Table 5) in a left outer join is included in the result table. The secund row has null values since there is no row in T2 where C3=20.

Left and right outer join are semantically equivalent to SPARQL OPTIONAL pattern, with the distinction that if the OPTIONAL does not find values in SPARQL, the variable becomes a wildcard. In SQL, if null values are returned, they stay null and joining any value with null results in null. Therefore, the implementations do not need all the mechanisms of the OPTIONAL to handle the fact that the following operator can depend on the result of the optional (i.e., with or without a wildcard).

Figure 12:
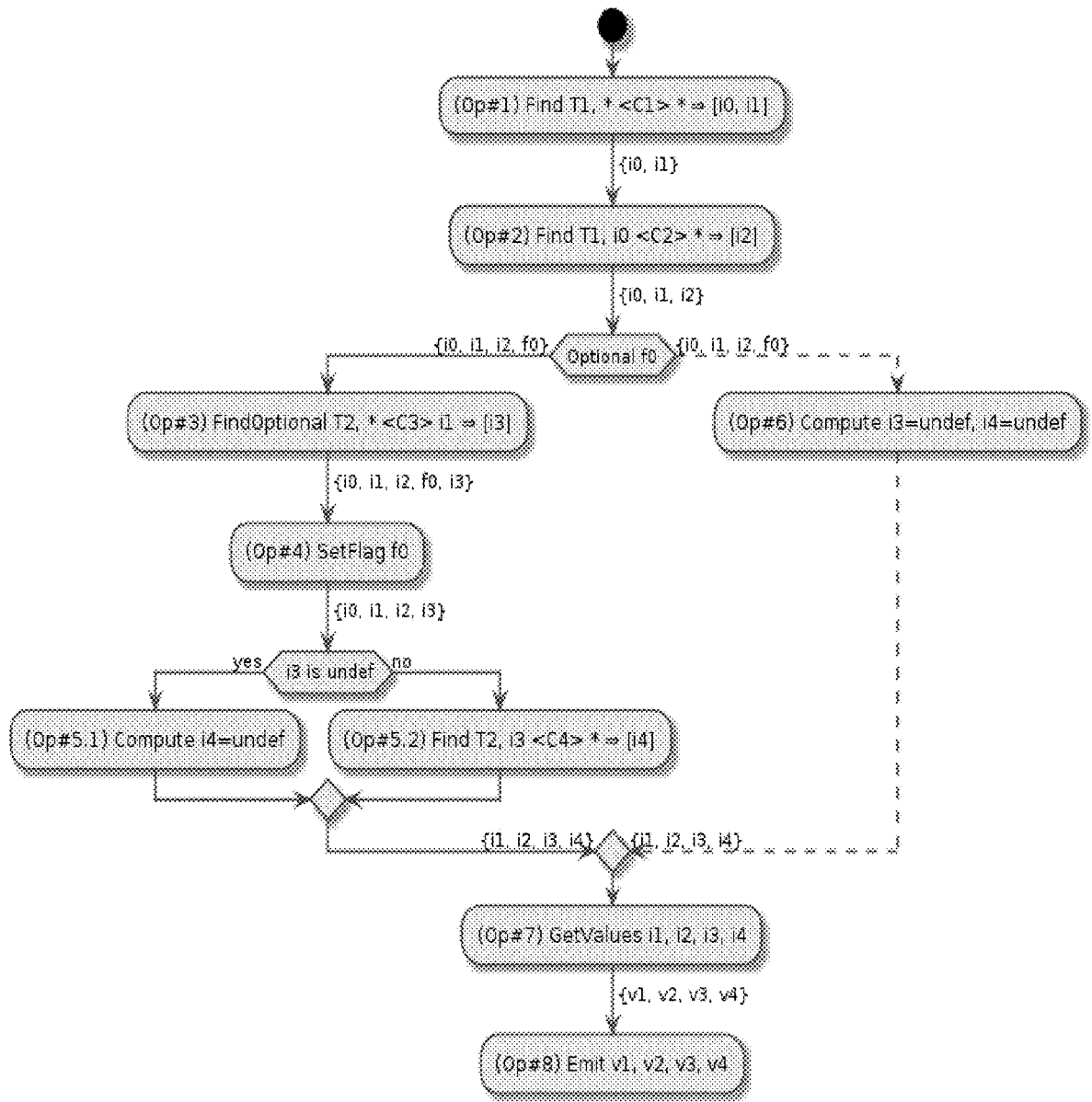

FIG. 12 presents an IR for the above example according to the implementations. The dashed line corresponds to Optional f0's second child.

Starting from table T1, the first operator Op #1 outputs for the column C1 as Table 13 below.

TABLE 13

| i0 | i1 |
|----|----|
| 10 | 10 |
| 20 | 20 |

Since the IR has a left join, all the column C2 appeared in the result upon the application of Op #2, using the primary key i0 from Op #1 to arrive at:

TABLE 14

| i0 | i1 | i2 |
|----|----|----|
| 10 | 10 | 15 |
| 20 | 20 | 25 |

The next operator is an optional operator which creates a flag f0: if it is never set, the dashed line will be executed. In this case, the operator Op #6 is used and sets to undef all the i3 and i4 columns. Otherwise Op #3 is used to do the actual join: to get all rows from T2.C3 with the same values as T1.C1. These values have been computed by Op #1 as i1. The result is Table 15 below:

TABLE 15

| i0 | i1 | i2 | i3 |
|----|----|----|----|
| 10 | 10 | 15 | 10 |
| 20 | 20 | 25 | undef |

There is an undef in the second row for i3 because there is no answer with primary key 20 in the column C3 of table T2. To get this undef when no results are found, the implementations use a FindOptional instead of a simple Find since a simple Find does not produce any output row if no match are found.

Next the implementations perform Op #4. As the results for the join are already found, the flag is set, and Op #6 is not executed. Op #5 gets the values for column C4 with the primary keys i3. As there is an undef in i3, this could not happen with SPARQL since it would be changed into a wildcard. In contrary, SQL does not do that and instead0 remains undef. Therefore, the implementations obtain an IF in the IR between to treat differently the undef case. Indeed, a Find does not accept undef as input. The results as this step are as Table 16 below

TABLE 16

| i1 | I2 | i3 | i4 |
|----|----|----|----|
| 10 | 15 | 10 | 42 |
| 20 | 25 | undef | undef |

In results of Table 16, i0 is dropped since it is not needed anymore. The implementations then get the final values as Table 17 below as index 42 means "BB", and undef are converted to null:

TABLE 17

| v1 | v2 | v3 | v4 |
|----|----|----|----|
| 10 | 15 | 10 | BB |
| 20 | 25 | null | null |

Outer joins are not associative, and the right outer join is the symmetric of the left outer join. The full outer join is the combination of left and right outer join, therefore with the same tables T1, and T2 as Table 5;

the result of:

```
SELECT *
FROM T1 FULL OUTER JOIN T2
ON T1.C1 = T2.C3
``` is as Table 18

TABLE 18

| C1 | C2 | C3 | C4 |
|------|------|------|------|
| 10 | 15 | 10 | BB |
| 20 | 25 | null | null |
| null | null | 15 | DD |

Figure 13:
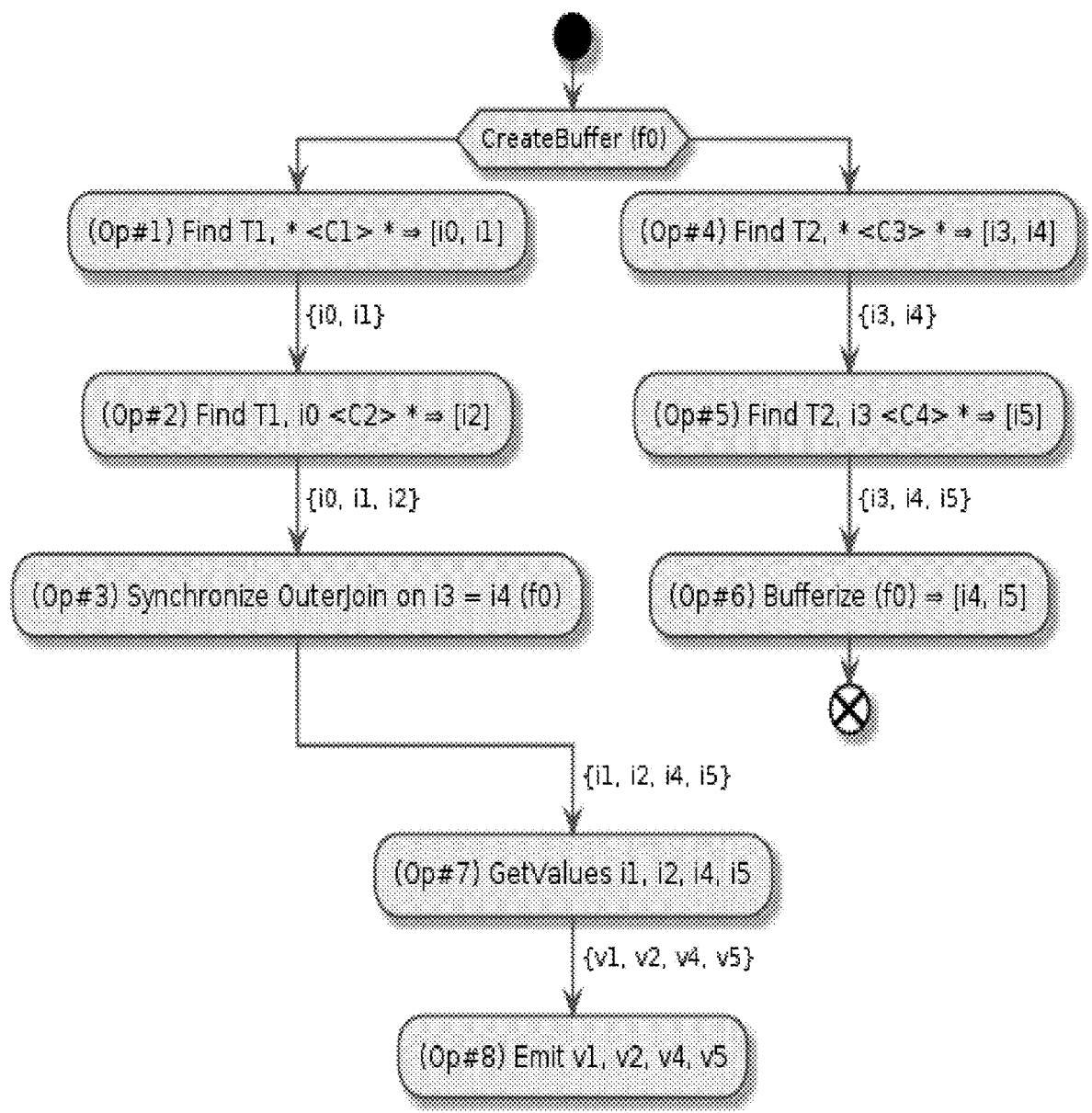

FIG. 13 presents the IR translation of the above query which is a mix between left/outer join and cross join. As in the Cartesian product of the cross join, the IR starts by creating a buffer with its flag f0. Then the IR gets all the rows for T2 (Op #4, Op #5) and buffers it, while getting all the rows from T1. The IR then synchronizes the T1 tasks with T2 tasks in Op #3 with doing an outer join on each row of the buffers coming from Op #2 and from Op #6, with the condition i3=i4. This means that for each row, the IR joins the rows (as Table 19 below) if i3=i4:

TABLE 19

| i1 | i2 | i4 | i5 |
|----|----|----|----|
| 10 | 15 | 10 | 42 | else one row is added with the values from Op #2 completed with undef as Table 20:

TABLE 20

| i1 | i2 | i3 | i4 |
|----|----|-------|-------|
| 10 | 15 | 10 | 42 |
| 20 | 25 | undef | undef | and one row is added to the above results with the values from Op #6 completed with undef as Table 21:

TABLE 21

| i1 | i2 | i3 | i4 |
|-------|-------|-------|-------|
| 10 | 15 | 10 | 42 |
| 20 | 25 | undef | undef |
| undef | undef | 15 | 52 |

This can be generalized with any ON search condition.

The Synchronize OuterJoin on search condition is a new node that needs to be added in the IR. It uses the same CreateBuffer and Bufferize nodes that were already introduced by the cross join. Two pieces of information should be known about this Bufferize node: when it can be used and when can be deleted. That is why it seems a generalization of the flag in the actual IR implementation.

Union Join

Union join works in a manner similar to the full outer join as discussed above, with the difference that it cannot specify a column matching. Instead, a union join does the following:
  create a new virtual table with the union of all columns from the source tables; and
  create a row in the new table with the values from the respective columns from each source table, with null values assigned to columns within each row from the other table.

Therefore, for the Table T1, and T2 of Table 5 the result of

SELECT *
FROM T1 UNION JOIN T2 is as Table 22 below.

TABLE 22

| C1 | C2 | C3 | C4 |
|------|------|------|------|
| 10 | 15 | null | null |
| 20 | 25 | null | null |
| null | null | 10 | BB |
| null | null | 15 | DD |

Figure 14:
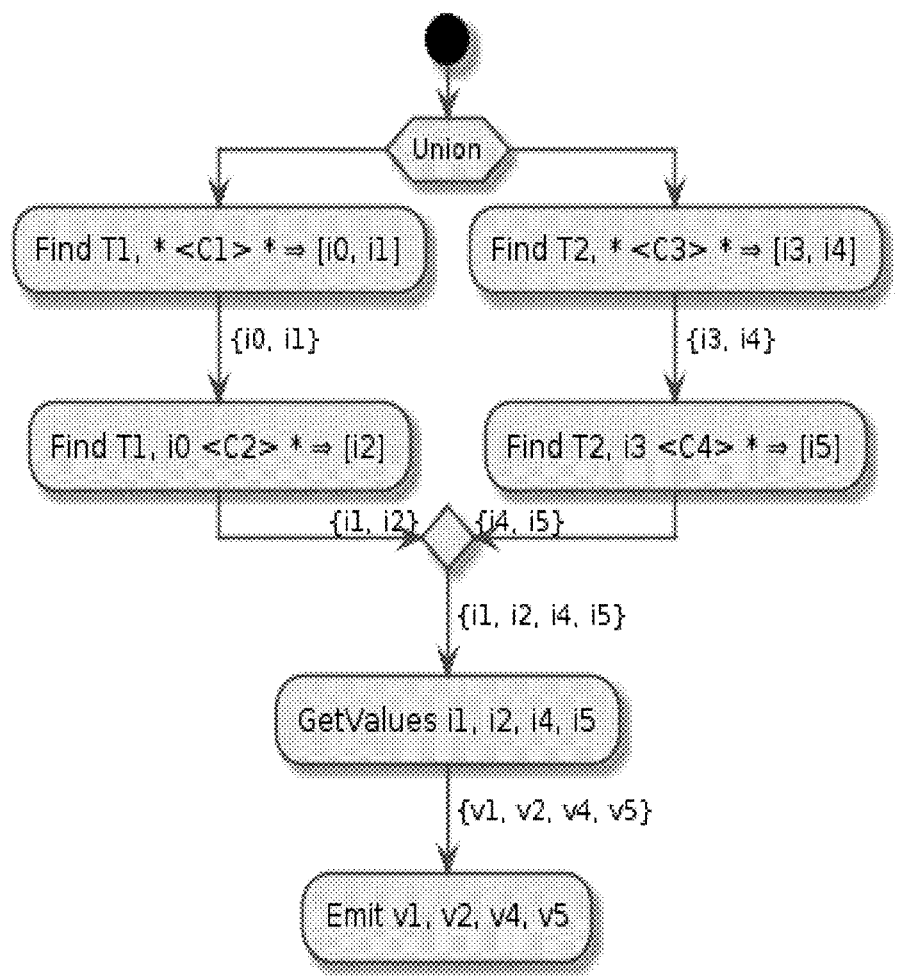

FIG. 14 presents the IR translation of the full outer join can then be simplified for union join as a simple buffer concatenation.

Scopes

In a JOIN operand, the scope of the range variables (as previously defined) is the join expression that immediately contains that join, excluding any select expression or join expression that is nested anywhere within the original join expression in which another range variable is introduced with the same name. Every column must have a name, and a name can be assigned if needed.

Derived Table

Remembering that the FROM clause is in the BNF:

```
<from clause> ::= FROM <table reference> [ { <comma> <table reference>
}... ]
    <table reference> ::=
        <table name> [ <correlation specification> ]
        | <derived table> <correlation specification>
        | <joined table>
The next table reference is the derived table which is defined as :
    <derived table> ::= < table subquery>
    <table subquery> ::= < subquery>
    <subquery> ::= < left paren> <query expression> <right paren>
    <query expression> ::= < non-join query expression> | <joined table>
    <non-join query expression> ::=
        <non-join query term>
        | <query expression> UNION [ ALL ] [ <corresponding spec> ] <query term>
        | <query expression> EXCEPT [ ALL ] [ <corresponding spec> ] <query term>
    <non-join query term> ::=
        <non-join query primary>
        | <query term> INTERSECT [ ALL ] [ <corresponding spec> ] <query primary>
```

Here the expressions UNION, EXCEPT and INTERSECT are non-join query expressions and are based on the union, difference and intersection operations of the set theory.

The basic query expressions are mapped to their equivalents in SPARQL. It is the case for the UNION, EXCEPT and INTERSECT outside of derived table. As with UNION, FILTER EXIST/NOT EXIST in SPARQL, there are operators for both languages very naturally which are mapped to the quantifiers of first-order logic, as detailed above.

WHERE

The WHERE clause is a mean to retrieve certain rows that meet a set of conditions. It requires a search condition, i.e., one or more predicates (in the predicate logic meaning, not the RDF meaning) combined with AND, OR and NOT.

```
<where clause> ::= WHERE <search condition>
<search condition> ::=
    <boolean term>
  | <search condition> OR <boolean term>
<boolean term> ::=
    <boolean factor>
  | <boolean term> AND <boolean factor>
<boolean factor> ::= [ NOT ] <boolean test>
<boolean test> ::= < boolean primary> [ IS [ NOT ] <truth value> ]
<boolean primary> ::= < predicate> | <left paren> <search condition>
<right paren>
<predicate> ::=
    <comparison predicate>
  | <between predicate>
  | <in predicate>
  | <like predicate>
  | <null predicate>
  | <quantified comparison predicate>
  | <exists predicate>
  | <match predicate>
  | <overlaps predicate>
```

The list of predicate types used in the above grammar is now explained.

Comparison

The comparison predicates are the usual self-explanatory <, =, >=, . . . with not equal being < >. The between predicate is a variant of the comparison predicate with the forms:

```
value1 BETWEEN value2 AND value3
value1 NOT BETWEEN value2 AND value3
which are equivalent to:
value1 >= value2 AND value1 <= value3
NOT ( value1 >= value2 AND value1 <= value3 )
```

The IR generates byte code for these operations and compares RDF terms. Based on the W3C recommendation "A Direct Mapping of Relational Data to RDF", (see www.w3.org/TR/rdb-direct-mapping/) which uses "R2RML: RDB to RDF Mapping Language" (see www.w3.org/TR/2012/REC-r2rml-20120927/), the implementations have natural mapping (see www.w3.org/TR/2012/REC-r2rml-20120927/#natural-mapping) of SQL values:

The natural RDF literal corresponding to a SQL data value is the result of applying the following steps:

Let dt be the SQL datatype of the SQL data value.

If dt is a character string type (in Core SQL 2008: CHARACTER, CHARACTER VARYING, CHARACTER LARGE OBJECT, NATIONAL CHARACTER, NATIONAL CHARACTER VARYING, NATIONAL CHARACTER LARGE OBJECT), then the result is a plain literal without language tag whose lexical form is the SQL data value.

Otherwise, if dt is listed in the table below: The result is a typed literal whose datatype IRI is the IRI indicated in the RDF datatype column in the same row as dt. The lexical form may be any lexical form that represents the same value as the SQL data value, according to the definition of the RDF datatype. If there are multiple lexical forms available that represent the same value (e.g., 1, +1, 1.0 and 1.0E0), then the choice is implementation dependent. However, the choice MUST be made so that given a target RDF datatype and value, the same lexical form is chosen consistently (e.g., INTEGER 5 and BIGINT 5 must be mapped to the same lexical form, as both are mapped to the RDF datatype xsd:integer and are equal values; mapping one to 5 and the other to +5 would be an error). The canonical lexical representation XMLSCHEMA2 MAY be chosen. (See also: Summary of XSD Lexical Forms)

Otherwise, the result is a plain literal without language tag whose lexical form is the SQL data value cast to string.

A summary is presented in Table 23 below:

TABLE 23

| SQL datatype | RDF datatype | Lexical transformation (informative) |
| --- | --- | --- |
| BINARY, BINARY VARYING, BINARY LARGE OBJECT | xsd:hexBinary | xsd:hexBinary lexical mapping |
| NUMERIC, DECIMAL | xsd:decimal | none required |
| SMALLINT, INTEGER, BIGINT | xsd:integer | none required |
| FLOAT, REAL, DOUBLE PRECISION | xsd:double | none required |
| BOOLEAN | xsd:boolean | ensure lowercase (true, false) |
| DATE | xsd:date | none required |
| TIME | xsd:time | none required |
| TIMESTAMP | xsd:dateTime | replace space character with "T" |
| INTERVAL | undefined | undefined |

The translation of INTERVAL is left undefined due to the complexity of the translation. SQL14 describes a translation of INTERVAL to xdt:yearMonthDuration and xdt:dayTimeDuration.

The database according to the implementations has the implementation-defined for numeric values based on xsd:numeric. For SQL, and in SQL2, the precision of many SQL datatypes is not fixed, but left implementation defined. Therefore, the mapping to XML Schema datatypes must rely on arbitrary-precision types such as xsd:decimal, xsd:integer and xsd:dateTime. Implementers of the mapping may wish to set upper limits for the supported precision of these XSD types. The XML Schema specification allows such partial implementations of infinite datatypes XMLSCHEMA2, and defines specific minimum requirements.

Therefore the implementations are identical to xsd:numeric and the same rules apply.

An RDF term can have a datatype, a lexical form and a canonical form. The rules are the following:

The natural RDF datatype corresponding to a SQL datatype is the value of the RDF datatype column in the row corresponding to the SQL datatype in the Table 23 above. The natural RDF lexical form corresponding to a SQL data value is the lexical form of its corresponding natural RDF literal, with the additional constraint that the canonical lexical representation XMLSCHEMA2 SHOULD be chosen. The canonical RDF lexical form corresponding to a SQL data value is the lexical form of its corresponding natural RDF literal, with the additional constraint that the canonical lexical representation XMLSCHEMA2 MUST be chosen.

GROUP BY

The input table is partitioned into one or more groups; the number of groups is the minimum such that, for each grouping column reference, no two rows of any group have different values for that grouping column. That is, for any group in the resulting grouped table, every row in the group has the same value for the grouping column. The grammar is:

```
<group by clause> ::= GROUP BY <grouping column reference list>
<grouping column reference list> ::=
    <grouping column reference> [ { <comma> <grouping column
    reference>
}... ]
<grouping column reference> ::= < column reference> [ <collate
clause> ]
<collate clause> ::= COLLATE <collation name>
<collation name> ::= < qualified name>
```

This is the same behavior as SPARQL. The COLLATE clause can be used to specify a collation used for ordering (for example SQL_Latin1_General_CP1_CS_AS). This is not supported in the IR. The implementations support GROUP BY without a collation for the sake of simplicity.

HAVING

The having clause is another filter applied to the grouped table resulting from the preceding clause, i.e., the result of the group by if there is any, otherwise the one resulting from the where clause (or the from clause if there is no WHERE clause the FROM is mandatory). In these last two cases, the input is treated as a grouped table with exactly one group. The only columns of the input table that the having clause can reference are the grouping columns, unless the columns are used in a set function (e.g., count, max, avg, etc., see dedicated section). This is the same behavior as in SPARQL. The grammar is:

```
<having clause> ::= HAVING <search condition>
```

SELECT List

The SELECT statement gives a query specification which starts by a select list. This list can be preceded by a set quantifier: ALL means do not eliminate duplicates while DISTINCT means eliminate redundant duplicates. The select list can either be an asterisk for all the columns that are part of the table corresponding to the table expression, or an explicit select-sublist can be used. A select sublist can be either a derived column or a qualifier (as seen previously, a qualifier is either a table name or a correlation name (ranged variable) that identifies a table in a particular scope) followed by a period and an asterisk: t.*.

```
<query specification> ::=
    SELECT [ <set quantifier> ] <select list> <table expression>
<select sublist> ::= < derived column> | <qualifier> <period> <asterisk>
<derived column> ::= < value expression> [ <as clause> ]
<as clause>
::= [ AS ] <column name>
<set quantifier>
::= DISTINCT | ALL
```

A derived column is a value expression (e.g., a column name) optionally followed by the keyword AS and a column name. A value expression can have no explicit name (e.g., "price/2"), in that case the standard explicitly requests that implementation must assign a name.

This is the same behavior in SPARQL.

DISTINCT and ORDERBY are also the same in SPARQL and in SQL.

Use Case Example

In an aspect the implementations may be related to an interaction with a large database, e.g., a large tabular data. Specifically the implementations may serve an interaction scroll of a large table of instances of a Bill of Material (BOM) (e.g., a web table of order of one million), with several columns for each line. The BOM is described using a semantic graph (e.g., RDF). A user may see a limited number of lines (e.g., one hundred) on the screen at a given time instant, so the use seeks to scroll interactively on the list.

Traditional approaches in relational database use pagination on (e.g., first the lines from 1 to 100, then 101 to 200, etc.) on materialized views to execute the whole query only once. Such create approaches a materialized view (en.wikipedia.org/wiki/Materialized_view) of the results of the query which includes only orderby clause (i.e., without no offset and limit clauses). The use may then query the view with offset/limit. An example of this approach is discussed in cloud.google.com/bigquery/docs/materialized-views-intro).

The approach discussed above works well when the input data are relational data, stored in tables, as the output data of the query are tuples that can be seen as a row in a table. Such output tuples can be used to create a materialized view from these tuples and stored as a table. The table is natively can be queried and viewed by SQL.

However, when the BOM is described using a semantic graph, the rows are ordered by instance name (e.g., one of the columns); therefore, it is mandatory to sort all rows before offsetting to get the next (e.g., one hundred) lines to be viewed. Results of a SPARQL query are also tuples (www.w3.org/TR/rdf-sparql-query/#docResultDesc) that can be seen as rows in a table. However, traditional approached of GDBMSs cannot store these results as a table nor can query a table natively in SPARQL using a graph query language. As a general rule interactivity is considered around up to 300 ms for response time and computing such a query may be too slow to be considered interactive. For examples, when the table has one million rows and eight columns, the whole query takes about 3 seconds. A solution to handle such a use case needs the capability to go backward or forward in the list without re-evaluating the query when scrolling. All data in the list must be consistent. In other words, all data must reflect the same state of the database (not, for example, some of a state before a write transaction and some of a state after said write transaction). Thereby, standard SPARQL queries with orderby/offset/limit are not efficient for this purpose (as they require re-evaluation). Using cursors as in RDFox also does not help as cursors cannot go backwards and all movements are forward.

The implementations for this use case may enhance SPARQL by a "CREATE VIEW" clause, similar to SQL, defined in SPARQL as:

```
<create view> ::= CREATE VIEW <view name> AS <SELECT QUERY>
``` where "view name" is an IRI and "SELECT QUERY" a standard SELECT SPARQL query.

As discussed above, the result of the SELECT query is a table of tuples. The implementations create a table from these tuples where the columns of the table are the output variables of the SELECT and the rows are the tuples. The implementations keep the tuples as indexes and not values to cost less storage.

Upon creating this table, an interaction (e.g., scrolling by a user) may issue SQL queries with limit/offset to do pagination and get the rows to display to the user. According to the implementations the creation of the view takes around 3 seconds a pagination query takes around 100 ms.

The invention claimed is:

1. A computer-implemented method for querying by a query engine on a database having relational data and graph data, the method comprising:
   receiving a query by the query engine, the query being in a language compatible with a first order logic paradigm;
   generating an intermediate representation (IR), the IR being compatible with a first order logic paradigm; and
   using the intermediate representation of the query for executing the query on the relational data and the graph data of the database,
   wherein the relational data of the database includes one or more tables and the graph data of the database includes one or more adjacency matrices, and
   wherein the receiving further comprises:
   when the query is a SPARQL (SPARQL Protocol and RDF Query Language) query, the generated intermediate representation is translated into a predicate calculus of a first order logic of the SPARQL query; and
   when the query is a SQL (Structured Query Language) query, the generated intermediate representation is translated into a predicate calculus of a first order logic of the SQL query.

2. The computer-implemented method of claim 1, wherein the query is a first SQL query, and the using of the intermediate representation of the query for executing the query on the graph data of the database includes:
   executing a SPARQL SELECT query on the graph data of the database thereby outputting tuples;
   creating a materialized view of the executed query; and
   executing the first SQL query on the created materialized view.

3. The computer-implemented method of claim 2, further comprising:
   receiving a second SQL query,
   wherein the executing of the second SQL query is based on the created materialized view of the first SQL query.

4. The computer-implemented method of claim 2, wherein the creating of the materialized view includes creating a table, wherein
   rows of said table are associated to the tuples; and
   columns of said table are associated to respective variables of the query.

5. The computer-implemented method of claim 2, wherein the creating of the materialized view includes creating a table, wherein
   rows of said table are associated to the tuples; and
   columns of said table are associated to respective variables of the query.

6. The computer-implemented method of claim 2, wherein the received query has at least one JOIN clause in SPARQL or in SQL, the generated intermediate representation being described with Backus-Naur Form (BNF) grammar of type:

```
<joined table> ::=
    <cross join>
    | <qualified join>
    | <left paren> <joined table> <right paren>
<cross join> ::=
    <table reference> CROSS JOIN <table reference>
<qualified join> ::=
    <table reference> [ NATURAL ] [ <join type> ] JOIN <table reference>
    [ <join specification> ]
<join type> ::=
    INNER
    | <outer join type> [ OUTER ]
    | UNION
<outer join type> ::= LEFT | RIGHT | FULL
<join specification> ::= < join condition> | <named columns join>
<join condition> ::= ON <search condition>
<named columns join> ::= USING <left paren> <join column list>
<right paren>
<join column list> ::= < column name list>.
```

7. The computer-implemented method of claim 1, wherein the received query has at least one JOIN clause in SPARQL or in SQL, the generated intermediate representation being described with Backus-Naur Form (BNF) grammar of type:

```
<joined table> ::=
    <cross join>
    | <qualified join>
    | <left paren> <joined table> <right paren>
<cross join>
    <table reference> CROSS JOIN <table reference>
<qualified join> ::=
    <table reference> [ NATURAL ] [ <join type> ] JOIN
    <table reference>
    [ <join specification> ]
<join type> ::=
    INNER
    | <outer join type> [ OUTER ]
    | UNION
<outer join type> ::= LEFT | RIGHT | FULL
<join specification> ::= < join condition> | <named columns join>
<join condition> ::= ON <search condition>
<named columns join> ::= USING <left paren> <join column list>
<right paren>
<join column list> ::= <column name list>.
```

8. The computer-implemented method of claim 1, wherein the received query has a FROM clause in SPARQL or in SQL, the generated intermediate representation being described with BNF grammar of type:

```
<from clause> ::= FROM <table reference> [ { <comma>
<table reference> } . . . ]
<table reference> ::=
```

-continued

```
<table name> [ <correlation specification> ]
| <derived table> <correlation specification>
| <joined table>.
```

9. The computer-implemented method of claim 8, wherein the FROM clause includes an AS clause, the generated intermediate representation being described with the BNF grammar of type:

```
<correlation specification> ::=
    [ AS ] <correlation name> [ <left paren> <derived column
    list> <right paren> ]
<derived column list> ::= <column name list>.
```

10. The computer-implemented method of claim 1, wherein the received query has a WHERE clause in SPARQL or in SQL, the generated intermediate representation being described with BNF grammar of type:

```
<where clause> ::= WHERE <search condition>
<search condition> ::=
    <boolean term>
    | <search condition> OR <boolean term>
<boolean term> ::=
    <boolean factor>
    | <boolean term> AND <boolean factor>
<boolean factor> ::= [ NOT ] <boolean test>
<boolean test> ::= < boolean primary> [ IS [ NOT ] <truth
value> ]
<boolean primary> ::= < predicate> | <left paren> <search
condition> <right paren>
<predicate> ::=
    <comparison predicate>
    | <between predicate>
    | <in predicate>
    | <like predicate>
    | <null predicate>
    | <quantified comparison predicate>
    | <exists predicate>
    | <match predicate>
    | <overlaps predicate>.
```

11. The computer-implemented method of claim 1, wherein the generated intermediate representation comprises at least one first FIND operator with at least an input, the method further comprising:
updating the generated intermediate representation by replacing the first find operator with a second find operator, the second find operator being configured to return undefined value when said input is null.

12. A non-transitory computer readable storage medium having recorded thereon a computer program implementing the method of claim 1.

13. The computer-implemented method of claim 1, wherein the relational data of the database includes one or more tables and the graph data of the database includes one or more adjacency matrices.

14. A system comprising:
a processor coupled to a memory, the memory having recorded thereon a computer program for querying by a query engine on a database having relational data and graph data that when executed by the processor causes the processor to be configured to:
receive a query by the query engine, the query being in a language compatible with a first order logic paradigm,
generate an intermediate representation (IR), the IR being compatible with a first order logic paradigm, and
use the intermediate representation of the query for executing the query on the relational data and the graph data of the database,
wherein the relational data of the database includes one or more tables and the graph data of the database includes one or more adjacency matrices, and
the processor is further configured to receive being configured to:
when the query is a SPARQL (SPARQL Protocol and RDF Query Language) query, translate the generated intermediate representation into a predicate calculus of a first order logic of the SPARQL query; and
when the query is a SQL (Structured Query Language) query, translate the generated intermediate representation into a predicate calculus of a first order logic of the SQL query.

* * * * *